(12) United States Patent
Mietke

(10) Patent No.: US 11,481,311 B2
(45) Date of Patent: Oct. 25, 2022

(54) AUTOMATIC EVALUATION OF TEST CODE QUALITY

(71) Applicant: SAP SE, Walldorf (DE)

(72) Inventor: Sebastian Mietke, Reilingen (DE)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 16/898,170

(22) Filed: Jun. 10, 2020

(65) Prior Publication Data

US 2021/0390038 A1    Dec. 16, 2021

(51) Int. Cl.
*G06F 11/36* (2006.01)
*G06N 20/00* (2019.01)
*G06K 9/62* (2022.01)

(52) U.S. Cl.
CPC ...... *G06F 11/3688* (2013.01); *G06F 11/3676* (2013.01); *G06F 11/3684* (2013.01); *G06F 11/3692* (2013.01); *G06K 9/6256* (2013.01); *G06N 20/00* (2019.01)

(58) Field of Classification Search
CPC ............ G06F 11/3688; G06F 11/3676; G06F 11/3684; G06F 11/3692; G06K 9/6256; G06N 20/00
See application file for complete search history.

(56) References Cited

U.S. PATENT DOCUMENTS

| | | | | |
|---|---|---|---|---|
| 8,561,021 | B2* | 10/2013 | Muharsky | G06F 11/3676 717/124 |
| 2011/0197176 | A1* | 8/2011 | Muharsky | G06F 11/3672 717/113 |
| 2012/0102458 | A1* | 4/2012 | Meijer | G06F 8/73 717/123 |
| 2017/0315903 | A1* | 11/2017 | David | G06F 11/3668 |
| 2018/0217922 | A1* | 8/2018 | Clement | G06F 11/3692 |
| 2021/0073110 | A1* | 3/2021 | Vidal | G06F 11/3684 |

OTHER PUBLICATIONS

Unit Testing in ABAP, https://help.sap.com/viewer/c238d694b825421f940829321ffa326a/7.5.9/en-US/4ec18be06e391014adc9fffe4e204223.html, at least as early as Jun. 10, 2020, 4 pages.
An Introduction to ABAP Unit Part 1, https://itpfed.com/an-introduction-to-abap-unit-part-1/, Feb. 14, 2019, 8 pages.
Mehra, "ABAP Units—Test a Little Implement a Little, Reflect a Little," https://sapyard.com/abap-units-test-a-little-implement-a-little-reflect-a-little/, May 19, 2019, 20 pages.
(Continued)

*Primary Examiner* — Ziaul A Chowdhury
(74) *Attorney, Agent, or Firm* — Klarquist Sparkman, LLP

(57) ABSTRACT

Techniques and solutions are described for automatically evaluating test code. In one technique, test code quality is evaluated by comparing assertions in test code with output values in target code tested by the test code. Output values that are not associated with assertions, or an insufficient number or variety of assertions can indicate that a test can be improved. In another technique, test quality is assessed by dynamically changing target code or test data used with a test. Room for test improvement can be indicated if test code provides a passing result despite changes to test data used with the test or changes to target code executed in conducting the test.

20 Claims, 12 Drawing Sheets

(56) References Cited

OTHER PUBLICATIONS

Patel., "ABAP Unit Test Driven Development—Basic Example," zevolving.com/2013/04/abap-unit-test-driven-development-basic-example/, Apr. 18, 2013.
Wood, ABAP Unit: Writing and Executing Unit Tests, https://www.sap-press.com/abap-unit-writing-and-executing-unit-tests_4298/, at least as early as Jun. 10, 2020, SAP Press, chapter 9, 343 pages.
Murugesan, "Understanding "ABAP Unit"" http://saptechnical.com/Tutorials/OOPS/ABAPUnit/Index.htm, at least as early as Jun. 10, 2020, 3 pages.
Shambhavi V, "SAP ABAP Unit test class with Test double," https://blogs.sap.com/2018/11/19/sap-abap-unit-test-class-with-test-double/, Nov. 19, 2018, 8 pages.
Göktas, "ABAP on HANA: Implementing AMDP," https://zbap.net/abap-on-hana-implementing-amdp-be5209fdde93?gi=5a7eda9763b2, May 18, 2017, 6 pages.
Using Constraints, http://saphelp.ucc.ovgu.de/NW750/EN/73/a417fb3e80462980dd4caf0a653041/frameset.htm in ABAP Unit Testing, at least as early as Jun. 10, 2020, 3 pages.
Beemanati, "SAP Code Inspector (SCI) Tutorial," https://blogs.sap.com/2011/02/11/sap-code-inspector-sci-tutorial/, Feb. 11, 2011, 15 pages.
Code Inspector, https://help.sap.com/viewer/ba879a6e2ea04d9bb94c7ccd7cdac446/7.51.6/en-US/49205531d0fcl4cfe10000000a42189b.html, at least as early as Jun. 10, 2020, 7 pages.
ABAP Test Cockpit(ATC)—Introduction and Steps, https://sapyard.com/abap-test-cockpitatc-introduction-and-steps/, Aug. 6, 2017, 14 pages.
Li, "Integrate ATC(ABAP Test Cockpit) or Code Inspector check with ChaRM," https://blogs.sap.com/2015/07/12/integrate-atcabap-test-cockpit-or-code-inspector-check-with-charm/, Jul. 12, 2015, 10 pages.
Dolinskaja, "Getting Started with the ABAP Test Cockpit for Developers," https://blogs.sap.com/2012/10/18/getting-started-with-the-abap-test-cockpit-for-developers/, Oct. 18, 2012, 13 pages.
Code Inspector, https://help.sap.com/saphelp_nwpi71/helpdata/en/8d/4b64488cce3945ba42b059319d62dc/content.htm?no_cache=true, at least as early as Jun. 10, 2020, 2 pages.
Methods of Class CL_ABAP_UNTI_ASSERT, https://help.sap.com/saphelp_sm71_sp13/helpdata/en/49/268dc67b6716b4e10000000a42189d/content.htm?no_cache=true, at least as early as Jun. 10, 2020, 3 pages.
Difference between Value Table and Check Table, https://www.stechies.com/difference-between-value-table-check-table/, Sep. 25, 2012, 5 pages.

* cited by examiner

Initial Code for actual method
method SEARCH_FLIGHTS_ECONOMY. ⌒110
                                114
TEST-SEAM fetch_planetype. ⌒112
CALL METHOD ME -> GET_PLANE_TYPE
IF ( PLANE_TYPE != NULL) CALL METHOD ME-> GET_SEATS.
end-test-seam. ⌒116
SELECT *  from sflight as a   INNER JOIN spfli as b
Loop at lt_flight_all into ls_flight.
IF ( ls_flight-SEATSMAX - ls_flight-SEATSOCC ) GE iv_ticket_count.
*   TEST-SPOT check_currency     ls_flight-CURRENCY
                              ⌒124
*   TEST-SPOT check_paymentsum ⌒126   ls_flight-PAYMENTSUM
    APPEND ls_flight to lt_flight_sel.
ENDIF.
ENDLOOP. ⌒140
      148  ⌒142
*   TEST-STUB calculate.
    CALL METHOD ME->CALCULATE.
*   End-test-stub. ⌒144
LOOP AT lt_flight_sel ASSIGNING <fs_flight>.
IF <fs_flight> is ASSIGNED.
    <fs_flight>-price = <fs_flight>-price - ( <fs_flight>-price * lv_discount / 100 ).
ENDIF.
*   TEST-SPOT final_table ⌒128   lt_flight_sel
    et_sflight = lt_flight_sel.
ENDLOOP.
endmethod.

⌒100

Test Code generated in Global Class
method SEARCH_FLIGHTS_ECONOMY. ⌒110
                                114
TEST-SEAM fetch_planetype. ⌒
PLANE_TYPE = '747'.
SEAT = 120; ⌒120
end-test-seam. ⌒116
⌒102 SELECT *  from sflight as a   INNER JOIN spfli as b
Loop at lt_flight_all into ls_flight.
IF ( ls_flight-SEATSMAX - ls_flight-SEATSOCC ) GE iv_ticket_count.
*   TEST-SPOT check_currency     ls_flight-CURRENCY
    ⌒124
    cl_abap_unit_assert=>ASSERT_EQUALS( act = ls_flight-CURRENCY
     exp = 'USD' ⌒130
     msg = 'Invalid currency' ).
*   TEST-SPOT check_paymentsum ⌒126   ls_flight-PAYMENTSUM
    APPEND ls_flight to lt_flight_sel.
ENDIF.
ENDLOOP.
         ⌒142         ⌒150
*   TEST-STUB calculate.
    CALL METHOD ME->STUB_CALCULATE.
*   End-test-stub. ⌒144
LOOP AT lt_flight_sel ASSIGNING <fs_flight>.
IF <fs_flight> is ASSIGNED.
    <fs_flight>-price = <fs_flight>-price - ( <fs_flight>-price * lv_discount / 100 ).
ENDIF.
*   TEST-SPOT final_table ⌒128   lt_flight_sel
    et_sflight = lt_flight_sel.
ENDLOOP.
endmethod.

FIG. 1

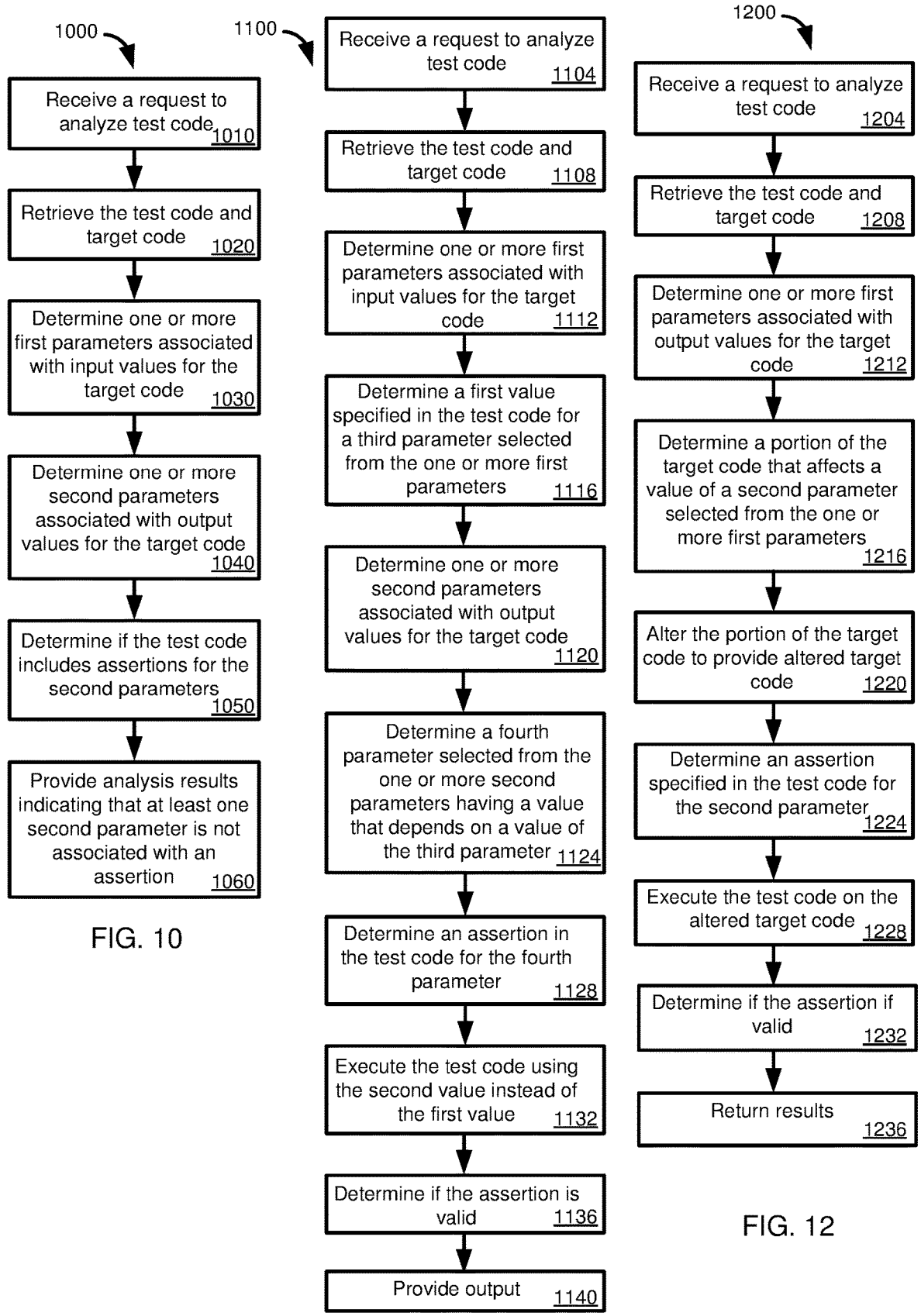

AUTOMATIC EVALUATION OF TEST CODE QUALITY

FIELD

The present disclosure generally relates to testing of computer program code. Particular implementations provide automated or semi-automated evaluation of test code to determine a quality of the test code in testing target code.

BACKGROUND

Determining and correcting the source of software errors or performance issues, commonly referred to as debugging, remains a major problem in software development. Several studies have estimated that debugging consumes over fifty percent of software development time and costs. Although software configuration management systems and formalized debugging approaches can assist in debugging efforts, debugging can remain a tedious, time consuming task.

In order to try and reduce bugs in released software code, software development processes typically include the development of various tests for code under development. Once test code is defined, it can be periodically executed against code being developed, which can be referred to as target code. In order to quantify or provide qualitative measures of the quality of a development process, common practice is to measure a percentage of target code that is subject to testing by test code. However, code coverage may not accurately reflect the quality of test code. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for automatically evaluating test code. In one technique, test code quality is evaluated by comparing assertions in test code with output values in target code tested by the test code. Output values that are not associated with assertions, or an insufficient number or variety of assertions can indicate that a test can be improved. In another technique, test quality is assessed by dynamically changing target code or test data used with a test. Room for test improvement can be indicated if test code provides a passing result despite changes to test data used with the test or changes to target code executed in conducting the test.

In one aspect, the present disclosure provides a technique for evaluating test code to determine if it includes assertions for output values of target code. A request to analyze test code is received. The test code and target code tested by the test code are retrieved. One or more first parameters associated with input values for the target code are determined. One or more second parameters associated with output values for the target code are determined. It is determined if the test code includes assertions for the second parameters. Analysis results are provided, indicating that at least one second parameter is not associated with an assertion.

In another aspect, the present disclosure provides a technique for evaluating test code by dynamically changing test data used by the test code. A request to analyze test code is received. The test code and target code tested by the test code are retrieved. One or more first parameters for the target code are determined, where the first parameters are associated with input values for the target code. A first value specified in the test code for a third parameter selected from the one or more first parameters is determined. One or more second parameters are determined for the test code, where the second parameters are associated with output values for the target code. A fourth parameter, selected from the one more second parameters, having a value that depends on a value of the third parameter is determined. An assertion specified in the test code for the fourth parameter is determined. The test code is executed using a second value instead of the first value. It is determined whether the assertion is valid using the second value. An output is provided, where the output is based at least in part on the determining if the assertion is valid.

In another aspect, the present disclosure provides a technique for evaluating test code by dynamically altering target code tested by the test code. A request to analyze test code is received. Test code and target code tested by the test code are retrieved. One or more first parameters associated with output values of the target code are determined. A portion of the target code is determined that affects a value of a second parameter selected from the one or more first parameters. The portion of target code is altered to produce altered target code. An assertion specified in the test code for the second parameter is determined. The test code is executed on the altered target code. It is determined whether the assertion is valid based on execution of test code on the altered target code. Results are returned, the results based at least in part on the determining if the assertion is valid.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 presents example original software code containing indicators for test code and a test version of the original software code with automatically inserted test code at activated indicators.

FIG. 10 is a flowchart illustrating a process of evaluating test code to determine if it contains assertions for output values of target code.

FIG. 11 is a flowchart illustrating a process of dynamically evaluating test code by dynamically altering values supplied to target code tested by the test code.

FIG. 12 is a flowchart illustrating a process of dynamically evaluating test code by dynamically altering target code tested by the test code.

DETAILED DESCRIPTION

Example 1—Overview

Figure 2:
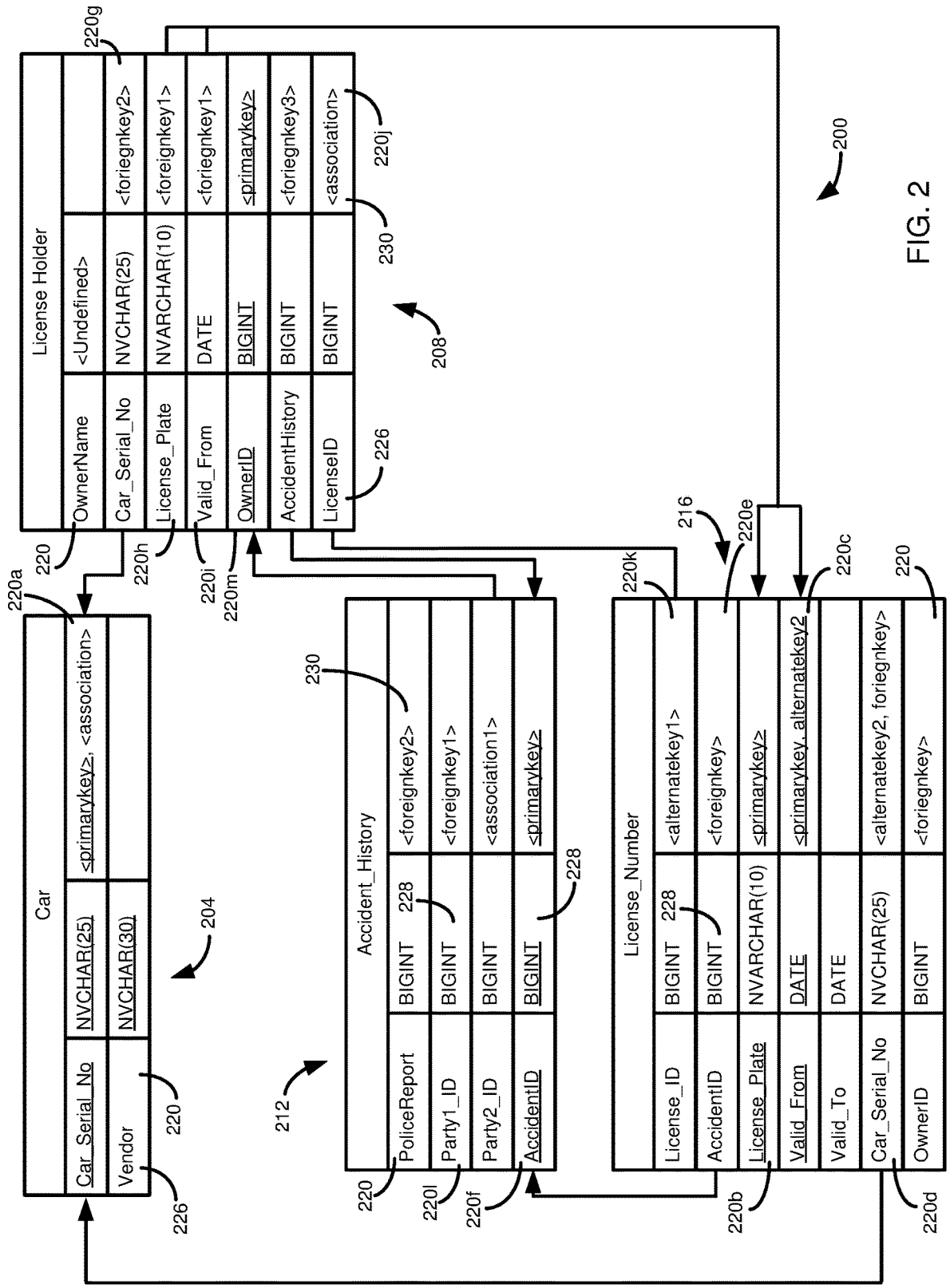
FIG. 2 is a diagram of a database schema showing technical relationships between at least a portion of database tables in the schema.

Software is ubiquitous in today's society. Software is being incorporated into an increasing number of devices, developed and improved for an ever increasing number of applications, and is growing ever more complex. Determining and correcting the source of software errors or performance issues, commonly referred to as debugging, remains a major problem in software development. Several studies have estimated that debugging consumes over fifty percent of software development time and costs.

As used herein, a bug, also referred to as a coding error or software defect or fault, refers to code behavior that produces unintended or undesirable behavior. Bugs can result from failure to follow the correct syntax of a programming language. Bugs can also result from improper code semantics or code design, such as mathematical operator errors (e.g., division by zero), variables that may go out of bounds (e.g., a variable that causes an array to go out of bounds), memory leaks, security flaws, or bugs that result from improper interaction of software modules or components. Categories of bugs can include arithmetic errors, logic errors, syntax errors, resource errors, threading errors, interface errors, or errors resulting from the interaction of different programmers. Bugs can be associated with these and other types. In some cases, error messages or codes, including error messages from exception handling routines, can provide an indication of a bug, including its type and possible information as to its cause.

Typically, software developers test code at various stages of development. Testing code can involve more than simply executing code and looking for errors. For example, in many cases, software development occurs in a componentized or modular fashion. Different developers, or development teams may be working on different parts of a larger program, or various components may be in different stages of development. If the components interact, it can be difficult to test a component whose operation depends on one or more other components that are not available, not fully developed, or are not suitably tested and debugged (which may, for example, make it more difficult to determine which component contains a bug).

One way to deal with the issue of incomplete or unavailable components is to hard code values (e.g., input values, which can be actual parameters or arguments) that may be externally supplied during "normal" software execution, such as values provided by user input, values from another data source (e.g., a database system that may not be available during testing), or values that may be returned by other component (e.g., return values from calling a function or method, or provided in response to an API call or similar mechanism). However, hard coding these values can be time consuming, particularly when the needed values may change at different points during software development, or when some values that were originally hard coded are later to be removed. Or, in the case of a call to a method, the developer may have to create an empty method that can be called, or create a method that contains sufficient functionality to allow testing (e.g., providing return values).

In some cases, rather than hard coding values, a developer may wish to replace or disable certain code sections that might be desired in the final version of the code, but which should not be run during testing. Although a developer can disable the code manually (e.g., by commenting it out or using a similar mechanism), and optionally insert different code instead, this process can be cumbersome, time consuming, and prone to errors. For example, when the developer continues to work on the code, it will be more cluttered and complex, and the temporary code may need to be removed or commented out.

When debugging, it can sometimes be difficult to determine if code is functioning properly. Even if an error is detected, it can be difficult to determine the source of an error. In some cases, it can be useful to output information, such as variable values, during program execution that is different than (or in addition to) any output that might be provided during normal program execution. A developer can manually cause such values to be checked or displayed (e.g., using cout statements in C++). Again, however, this process can be time consuming and can result in code that is more cluttered, complex, and difficult to read. When checks are performed, such as on variables, the nature of the check can vary over time, which may cause the check to be rewritten or edited, further increasing development time and costs.

In order to quantify or provide qualitative measures of the quality of a development process, common practice is to measure a percentage of target code that is subject to testing by test code. However, code coverage may not accurately reflect the quality of test code. Code coverage can be tracked at a relatively high level, such as on a statement level. In these cases, as long as a statement is called, such as a logic statement (e.g., an IF block) being called, all code associated with the statement is considered to be covered. Code coverage can be determined more granularly, such as by looking at coverage for individual branches of a statement (e.g., considering whether all possible branches of an IF statement are called, such as all possible ELSE conditions, or if all different cases for a switch statement are called during testing).

Whether a given statement or branch is called, however, may not provide accurate insights into code quality. For example, if code is supposed to produce a particular value given particular input, simply calling the code does not indicate that the code is correct. As long as the code does not produce a compilation or runtime error, code coverage could be very high and test code could provide a "passing" result, even though the code may provide completely wrong output. In this case, significant development effort may have been expended in developing test code, and code may have been disfigured and made more complex through the introduction of test code and elements in the target code related to testing. Despite this disfigurement, the testing can be of poor quality even though it exhibits a high degree of code coverage for the target code. Accordingly, room for improvement exists.

The present disclosure provides techniques for assessing the quality of test code, which can be used in place of or in addition to other techniques for evaluating test code, such as measurements of code coverage. In one aspect, test code is evaluated to determine if output values of target code are associated with assertions in test code. Evaluating the test code can include determining whether any assertions are present for a given output value. Evaluating the test code can also include determining whether a number or diversity (e.g., number of values tested) of assertions are sufficient for an output value, including by considering an amount of processing for an input value used in producing a given output value.

In other aspect, the present disclosure provides techniques for dynamically evaluating test code by altering test data or altering target code. Evaluations performed by altering test data can include determining whether an assertion returns true or false if input values provided by a test are altered. Evaluations performed by altering target code can include determining whether an assertion returns true or false if target code is modified, particularly target code that is associated with determining an output value tested by the assertion.

Dynamic testing can be facilitated using a machine learning model. The machine learning model can suggest target code modifications or test data modifications that might be expected to result in failure of a test code assertion. If the assertion does not fail, evaluation results for the test code can indicate to a user that an assertion may not be of sufficient quality, and can optionally suggest additional assertions or changes to an assertion such that test code will fail under appropriate circumstances. A machine learning model may also be used to provide an indication of test code quality, such as when the machine learning model has been trained with examples of test code having various quality levels or results of evaluating other test code.

Example 2 describes various ways in which target code can be tested. Although described techniques can be used with separate test code, they can also be used when test code is embedded within target code. For example, assertions can be included in test code that is applied to target code, or can be included in the target code itself, including when target code is rewritten or modified for testing purposes. Examples 3-5 describe how data types used in a virtual or physical data model can be interrelated. These interrelationships can be used, for example, in using historical test data to determine how particular test code should be evaluated, such as being used to suggest test data values to use for testing particular target code based on historical data for other code that uses the same data type as an input or output value. Examples 6-11 provide details regarding disclosed techniques for evaluating test code.

The disclosed techniques can thus be advantageous by providing information about not just whether target code is covered by a test, but also if the test is effective. As explained above, effective tests are expected to fail, and the more a test fails when test data or test code is changed, the more sensitive (e.g., higher quality) the test can be. In some cases, having higher quality tests can reduce the number of tests needed, which can simply both development and production code (e.g., because the target, production, code may be less disfigured by testing artefacts). The disclosed techniques can allow a developer to get a better sense of software quality by evaluating the quality of tests used with the software. If particular tests are identified as potentially of poor quality using disclosed techniques, the developer can focus on improving those tests, rather than having to review every individual test (including tests which might have acceptable performance, and thus which did not need review).

Example 2—Example Features to Facilitate Code Testing

FIG. 1 provides an example original code segment 100, representing production code, such as production code being developed, and an example test code segment 102, such as test code that is at least partially automatically generated from the original code segment 100. The test code segment 102 can be generated from the original code segment 100 using one or more of the techniques disclosed in this Example 2. Further details of these techniques can be found in U.S. Pat. No. 10,496,379, which is incorporated by reference herein in its entirety.

The original source code segment 100 represents a portion of code for a method 110, such as a method to search for available economy class seats on a particular flight itinerary. The code for the method 110 includes a modifiable code segment in the form of a replaceable or substitutable code segment 112, which can also be referred to as a SEAM (such as in products available from SAP SE, of Walldorf, Germany). A replaceable code segment 112 can be indicated in various ways, such as by including a statement 114 indicating a starting position for the replaceable code segment, and a statement 116 indicating an end position for the replaceable code segment. The replaceable code segment 112 can be selectively executed, replaced with other code, or simply not executed (which can be equivalent to replacing the replaceable code segment with "empty" code, or commenting out or otherwise rendering unexecutable the replaceable code segment).

The test code segment 102 includes the statements 114 and 116 indicating the replaceable code segment 112, but the code of the replaceable code segment has been replaced by substitute code 120. Substitute code 120 can be, for example, code provided by a developer in order to generate the test code segment 102. The test code 102 can be automatically generated by replacing the replaceable code segment 112 with the substitute code 120.

Original code segment 100 includes code checkpoints 124, 126, 128, which can also be referred to as SPOTs. The code checkpoints 124, 126, 128 can be indicated by a particular keyword (e.g., "TEST-SPOT") and can include one or more identifiers, such as a name of the checkpoint (e.g., "check_currency) and a variable (e.g., "ls_flight-CURRENCY"). Note that code is not otherwise associated with the checkpoints 124, 126, 128 in the original source code segment 100.

The test code segment 102 illustrates how code for checkpoints, such as checkpoints 124, 126, 128, can be added. A user interface, such as in the form of a wizard, can be provided to allow a user to select which checkpoints to use or activate, and to specify how values should be checked, such determining the status of a variable, including whether the variable has been assigned and its value relative to another value (e.g., a value supplied by the developer via the user interface). The test code 102 can be generated by automatically adding appropriate code proximate the checkpoint 124, 126, 128. For example, test code 102 shows checkpoint code 130 added after checkpoint 124, while checkpoints 126 and 128 have not been activated. Checkpoint code 130 indicates that a variable is to be checked as equal to a certain value, and an error message displayed if the variable is not equal to the value.

Both the original code segment 100 and the test code segment 102 include a modifiable code segment in the form of a redirectable method call 140, which can also be referred to as STUBs (including as implemented in products of SAP SE, of Walldorf, Germany) The redirectable method call 140 can be a method for which a substitute implementation can be created during testing, and the replaceable call can be substituted with a call to the substitute implementation. When the original code segment is deployed in a production environment, the redirectable method call 140 can be left unchanged and can call a production method.

The redirectable method call 140 can be indicated as such using a starting statement 142 and an ending statement 144. In at least some cases, the starting and ending statements 142, 144 are used to designate a redirectable method call 140. In some cases, having a commented redirectable method call in the original code segment would typically require the original code segment 100 to be changed prior to being executed in a production environment (e.g., the commenting would have to be removed to make the removable method call active). Thus, the use of the starting and ending segments 142, 144 can facilitate code testing by allowing redirectable method calls 140 to be located and handled without requiring the original code segment 100 to be modified prior to deployment.

The redirectable method call 140 can include an identifier 148, such as a name. The identifier 148 can be used to provide an option to a user to active the redirectable method call 140 during testing, which can then be directed to call a non-production method, or not to activate the test method call, which can then be directed to call the production method during testing. A user can supply code for the non-production method. In the test code 102, the redirectable method call 140 has been changed to substitute method call 150.

In at least some aspects, the original code segment 100 and the test code segment 102 are separately maintained. That is, when testing is to be performed, the original code segment 100 is analyzed, such as to determine the presence, and, typically, identifiers, for the replaceable code segment 112, the code checkpoints 124, 126, 128, and the redirectable method call 140. For the replaceable code segment 112 and code checkpoints 124, 126, 128, if they are activated for testing, the replaceable code segment is replaced with substitute code 120, and suitable code, such as checkpoint code 130, is added for activated code checkpoints.

Thus, testing can produce the test code segment 102 such that the original code segment 100 need not be modified. Maintaining the test code segment 102 separately from the original code segment 100 can result in the original code segment being easier to read and maintain, as it does not include much of the test-specific code of the test code segment. Similarly, particularly when source code, or other human-readable code is shipped, the code can omit much of the test-specific code (or, in further cases, all test-specific code can be removed, such as by removing lines having starting and ending segments 142, 144). As the original code segment 100 typically has fewer lines that the test code segment 102, it can also be smaller (whether compiled or not) that the test code segment. In addition, having fewer lines of code, the production code can be more secure.

Example 3—Example Table Elements Including Semantic Identifiers

Database systems typically include an information repository that stores information regarding a database schema. For instance, PostgreSQL includes an INFORMATION_SCHEMA that includes information regarding tables in a database system, and certain table components, such as attributes (or fields) and their associated datatypes (e.g., varchar, int, float). Other database systems, or query languages, include similar concepts. However, these types of repositories typically only store technical information regarding database components, not semantic information.

Other database systems, or applications or frameworks that operate using a database layer, may include repositories that store semantic information for data. For instance, SAP SE of Walldorf, Germany, provides the ABAP programming language which can be used in conjunction with database systems. ABAP provides the ability to develop database applications that are agnostic to the nature, including vendor, of the underlying relational database management system. In part, this ability is enabled using a data dictionary. The data dictionary can include at least some information that is similar to information that is maintained in an information schema. However, the data dictionary can include semantic information regarding data, and optionally additional technical information.

In addition, the data dictionary can include textual information regarding fields in a table, such as human-readable descriptions (sometimes in different languages, such as English, French, or German) of the purpose or use of the field. In at least some cases, the textual information can serve as semantic information to a computer. However, other types of semantic information need not necessarily be (at least easily) human-understandable, but can be easier for a computer to process than parsing textual information primary intended for human use. Data dictionaries can also contain or express relations between data dictionary objects through various properties (which can be reflected in metadata), such as having the data dictionary reflect that dictionary objects are assigned to packages, and thus having a relationship to one another through a package assignment.

As used herein, "technical information" (or technical metadata) relates to information that describes data as data, which is information such as a type that can be used to interpret a value of the data, and which can influence how the data is processed. For instance, the value "6453" could be interpreted (or cast) as an integer, a float, a string, or an array of characters, among various possibilities. A value may be processed differently, in some cases, depending on whether it is a number, such as an integer or a float, or whether it is treated as a collection of characters. Similarly, technical information can specify acceptable values for data, such as a length or a number of decimal places that are allowed. The technical information can specify properties of the data without concern regarding what the data represents or "means." Of course, however, a designer of a database system can select particular technical properties for particular data knowing themselves the semantic properties of the data—e.g., "If I intend to have a value representing a person's name, I should use a string or array of characters rather than a float." On the other hand, in at least some cases, data types might be a type that would not be expected by a database administrator or user. For instance, rather than using a person's name to identify data associated with the person, a separate numerical or alphanumerical identifier might be used, which might be counter intuitive based on the "meaning" of the data (e.g., "I do not consider myself to be a number").

As used herein, "semantic information" (or semantic metadata) relates to information that describes the meaning or purpose of data, which meaning or purpose can be to a human or to a computer process. As an example, technical data information may specify that data is obtained having a value in the format "XXX-XX-XXXX," where X is an integer between 0 and 9. That technical information can be used to determine how the data should be processed, or whether a particular value is valid (e.g., "111-11-1111" is, but "1111-11-1111" is not), but does not indicate what the value represents. Semantic information associated with the data can indicate whether the value is a social security number, a telephone number, a routing address, etc.

Semantic information can also describe how data is to be processed or displayed. For instance, "knowing" that data is a telephone number may cause the value to be displayed in one part of a GUI as opposed to another part of a GUI, or may invoke or not invoke particular processing rules depending on if the rule is active for "telephone number." In at least some cases, "semantic information" can include other types of information that can be used to describe data, or how it should be used or processed. In a particular case, data can be associated with one or more of a label, such as a human understandable description of the data (e.g., "telephone number"), documentation, such as a description of what information should be included in a field having the label (e.g., "enter an 11 digit phone number including area code"), or information that can be used in a help screen (e.g., "enter your home phone number here").

Typically, technical information must be provided for data. In the case of a field of a database table, for example, it is typically necessary to provide a name or identifier for a field and a datatype. The name or identifier for a field might, or might not, serve to provide semantic information. That is, a database designer might choose a name of "Employee_Name," "EMPN," or "3152." However, as the name or identifier is used to locate/differentiate the field from another field, in the context of the present disclosure, it is considered to be technical information, rather than semantic information, even if it may readily convey meaning to a human. In at least some implementations, the use of semantic information is optional. For instance, even using the data dictionary, some fields used in database objects (such as tables, but potentially other objects too, where such other objects are typically associated with one or more tables in an underlying relational database system) can be specified without the use of semantic information, while other fields are associated with semantic information.

FIG. 2 is an example entity-relation (ER) type diagram illustrating a data schema 200, or metadata model, related to a driver's accident history. The schema 200 (which can be part of a larger schema, the other components not being shown in FIG. 2) can include a table 208 associated with a license holder (e.g., an individual having a driver's license), a table 212 associated with a license, a table 216 representing an accident history, and a table 204 representing cars (or other vehicles).

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

Schema information is typically maintained in a database layer, such as a software layer associated with where table values are maintained (e.g., in a RDBMS), and typically includes identifiers for the tables 204, 208, 212, 216, and the name 226 and datatype 228 of their associated attributes 220. Schema information may also include at least some of the information conveyable using the flag 230, such as whether a field is associated with a primary key, or indicating a foreign key relationship. However, other relationships, including more informal associations, may not be included in a schema associated with a database layer (e.g., the INFORMATION_SCHEMA of PostgreSQL).

Example 4—Example Table Elements Including Semantic Identifiers

Figure 3:
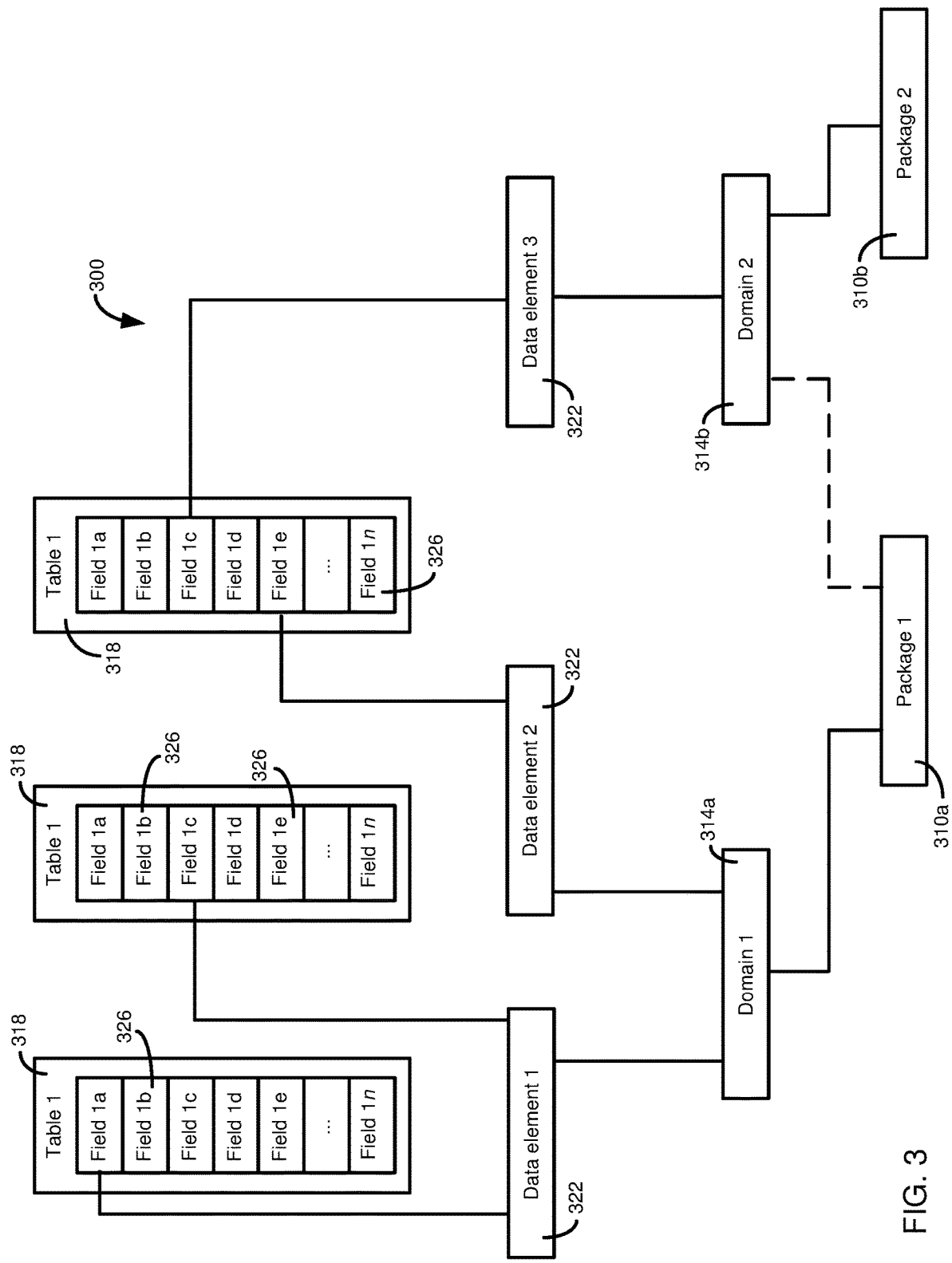
FIG. 3 is a schematic diagram illustrating relationships between table elements that can be included in a data dictionary, or otherwise used to define database tables.

FIG. 3 is a diagram illustrating elements of a database schema 300 and how they can be interrelated. In at least some cases, the database schema 300 can be maintained other than at the database layer of a database system. That is, for example, the database schema 300 can be independent of the underlying database, including a schema used for the underlying database. Typically, the database schema 300 is mapped to a schema of the database layer (e.g., schema 200 of FIG. 2), such that records, or portions thereof (e.g., particular values of particular fields) can be retrieved through the database schema 300.

The database schema 300 can include one or more packages 310. A package 310 can represent an organizational component used to categorize or classify other elements of the schema 300. For example, the package 310 can be replicated or deployed to various database systems. The package 310 can also be used to enforce security restrictions, such as by restricting access of particular users or particular applications to particular schema elements.

A package 310 can be associated with one or more domains 314 (i.e., a particular type of semantic identifier or semantic information). In turn, a domain 314 can be associated with one or more packages 310. For instance, domain 1, 314a, is associated only with package 310a, while domain 2, 314b, is associated with package 310a and package 310b. In at least some cases, a domain 314 can specify which packages 310 may use the domain. For instance, it may be that a domain 314 associated with materials used in a manufacturing process can be used by a process-control application, but not by a human resources application.

In at least some implementations, although multiple packages 310 can access a domain 314 (and database objects that incorporate the domain), a domain (and optionally other database objects, such as tables 318, data elements 322, and fields 326, described in more detail below) is primarily assigned to one package. Assigning a domain 314, and other database objects, to a unique package can help create logical (or semantic) relationships between database objects. In FIG. 3, an assignment of a domain 314 to a package 310 is shown as a solid line, while an access permission is shown as a dashed line. So, domain 314a is assigned to package 310a, and domain 314b is assigned to package 310b. Package 310a can access domain 314b, but package 310b cannot access domain 314a.

Note that at least certain database objects, such as tables 318, can include database objects that are associated with multiple packages. For example, a table 318, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 314 (that is, the domains can provide further semantic context for database objects that are associated with an object of another package, rather than being assigned to a common package).

As will be explained in more detail, a domain 314 can represent the most granular unit from which database tables 318 or other schema elements or objects can be constructed. For instance, a domain 314 may at least be associated with a datatype. Each domain 314 is associated with a unique name or identifier, and is typically associated with a description, such as a human readable textual description (or an identifier than can be correlated with a human readable textual description) providing the semantic meaning of the domain. For instance, one domain 314 can be an integer value representing a phone number, while another domain can be an integer value representing a part number, while yet another integer domain may represent a social security number. The domain 314 thus can held provide common and consistent use (e.g., semantic meaning) across the schema 300. That is, for example, whenever a domain representing a social security number is used, the corresponding fields can be recognized as having this meaning even if the fields or data elements have different identifiers or other characteristics for different tables.

The schema 300 can include one or more data elements 322. Each data element 322 is typically associated with a single domain 314. However, multiple data elements 322 can be associated with a particular domain 314. Although not shown, multiple elements of a table 318 can be associated with the same data element 322, or can be associated with different data elements having the same domain 314. Data elements 322 can serve, among other things, to allow a domain 314 to be customized for a particular table 318. Thus, the data elements 322 can provide additional semantic information for an element of a table 318.

Tables 318 include one or more fields 326, at least a portion of which are mapped to data elements 322. The fields 326 can be mapped to a schema of a database layer, or the tables 318 can be mapped to a database layer in another manner. In any case, in some embodiments, the fields 326 are mapped to a database layer in some manner Or, a database schema can include semantic information equivalent to elements of the schema 300, including the domains 314.

In some embodiments, one or more of the fields 326 are not mapped to a domain 314. For example, the fields 326 can be associated with primitive data components (e.g., primitive datatypes, such as integers, strings, Boolean values, character arrays, etc.), where the primitive data components do not include semantic information. Or, a database system can include one or more tables 318 that do not include any fields 326 that are associated with a domain 314. However, the disclosed technologies can include a schema 300 (which can be separate from, or incorporated into, a database schema) that includes a plurality of tables 318 having at least one field 326 that is associated with a domain 314, directly or through a data element 322.

Example 5—Example Data Dictionary Components

Schema information, such as information associated with the schema 200 of FIG. 2 or the schema 300 of FIG. 3, can be stored in a repository, such as a data dictionary. In at least some cases the data dictionary is independent of, but mapped to, an underlying relational database. Such independence can allow the same database schema 200, 300 to be mapped to different underlying databases (e.g., databases using software from different vendors, or different software versions or products from the same vendor). The data dictionary can be persisted, such as being maintained in stored tables, and can be maintained in memory, either in whole or part. An in-memory version of a data dictionary can be referred to as a dictionary buffer.

Figure 4:
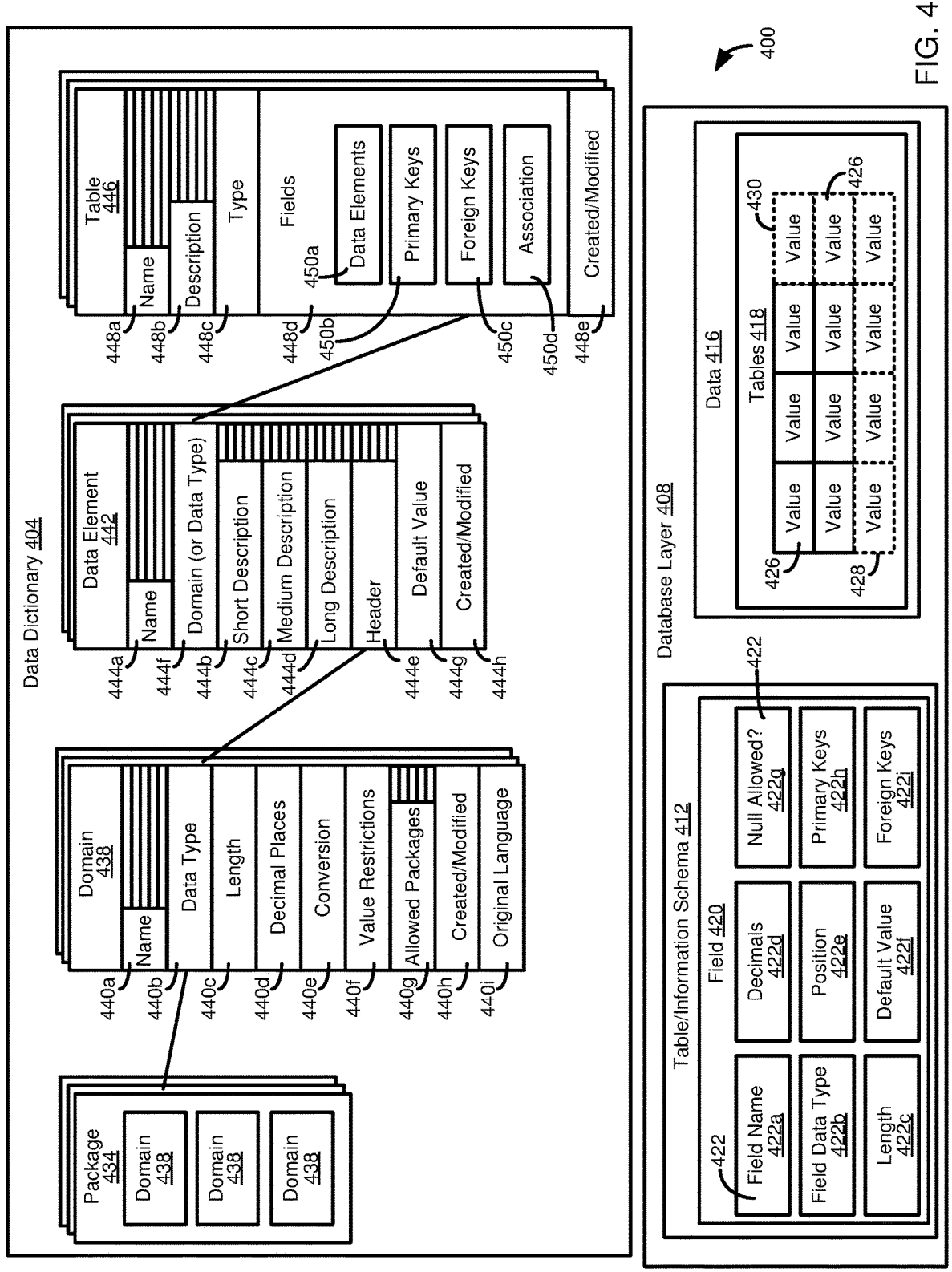
FIG. 4 a schematic diagram illustrating components of a data dictionary and components of a database layer.

FIG. 4 illustrates a database environment 400 having a data dictionary 404 that can access, such as through a mapping, a database layer 408. The database layer 408 can include a schema 412 (e.g., an INFORMATION_SCHEMA as in PostgreSQL) and data 416, such as data associated with tables 418. The schema 412 includes various technical data items/components 422, which can be associated with a field 420, such as a field name 422a (which may or may not correspond to a readily human-understandable description of the purpose of the field, or otherwise explicitly describe the semantic meaning of values for that field), a field data type 422b (e.g., integer, varchar, string, Boolean), a length 422c (e.g., the size of a number, the length of a string, etc., allowed for values in the field), a number of decimal places 422d (optionally, for suitable datatypes, such as, for a float with length 6, specifying whether the values represent XX.XXXX or XXX.XXX), a position 422e (e.g., a position in the table where the field should be displayed, such as being the first displayed field, the second displayed field, etc.), optionally, a default value 422f (e.g., "NULL," "0," or some other value), a NULL flag 422g indicating whether NULL values are allowed for the field, a primary key flag 422h indicating whether the field is, or is used in, a primary key for the table, and a foreign key element 422i, which can indicate whether the field 420 is associated with a primary key of another table, and, optionally, an identifier of the table/field referenced by the foreign key element. A particular schema 412 can include more, fewer, or different technical data items 422 than shown in FIG. 4.

The tables 418 are associated with one or more values 426. The values 426 are typically associated with a field 420 defined using one or more of the technical data elements 422. That is, each row 428 typically represents a unique tuple or record, and each column 430 is typically associated with a definition of a particular field 420. A table 418 typically is defined as a collection of the fields 420, and is given a unique identifier.

The data dictionary 404 includes one or more packages 434, one or more domains 438, one or more data elements 442, and one or more tables 446, which can at least generally correspond to the similarly titled components 310, 314, 322, 318, respectively, of FIG. 3. As explained in the discussion of FIG. 3, a package 434 includes one or more (typically a plurality) of domains 438. Each domain 438 is defined by a plurality of domain elements 440. The domain elements 440 can include one or more names 440a. The names 440a serve to identify, in some cases uniquely, a particular domain 438. A domain 438 includes at least one unique name 440a, and may include one or more names that may or may not be unique. Names which may or may not be unique can include versions of a name, or a description, of the domain 438 at various lengths or levels of detail. For instance, names 440a can include text that can be used as a label for the domain 438, and can include short, medium, and long versions, as well as text that can be specified as a heading. Or, the names 440a can include a primary name or identifier and a short description or field label that provides human understandable semantics for the domain 438.

In at least some cases, the data dictionary 404 can store at least a portion of the names 440a in multiple language, such as having domain labels available for multiple languages. In embodiments of the disclosed technologies, when domain information is used for identifying relationships between tables or other database elements or objects, including searching for particular values, information, such as names 440a, in multiple languages can be searched. For instance, if "customer" is specified, the German and French portion of the names 440a can be searched as well as an English version.

The domain elements 440 can also include information that is at least similar to information that can be included in the schema 412. For example, the domain elements 440 can include a data type 440b, a length 440c, and a number of decimal places 440d associated with relevant data types, which can correspond to the technical data elements 422b, 422c, 422d, respectively. The domain elements 440 can include conversion information 440e. The conversion information 440e can be used to convert (or interconvert) values entered for the domain 438 (including, optionally, as modified by a data element 442). For instance, conversion information 440e can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 438 can be stored in a repository, such as a field catalog.

The domain elements 440 can include one or more value restrictions 440f. A value restriction 440f can specify, for example, that negative values are or are not allowed, or particular ranges or threshold of values that are acceptable for a domain 438. In some cases, an error message or similar indication can be provided as a value is attempted to be used with a domain 438 that does not comply with a value restriction 440f. A domain element 440g can specify one or more packages 434 that are allowed to use the domain 438.

A domain element 440h can specify metadata that records creation or modification events associated with a domain element 438. For instance, the domain element 440h can record the identity of a user or application that last modified the domain element 440h, and a time that the modification occurred. In some cases, the domain element 440h stores a larger history, including a complete history, of creation and modification of a domain 438.

A domain element 440i can specify an original language associated with a domain 438, including the names 440a. The domain element 440i can be useful, for example, when it is to be determined whether the names 440a should be converted to another language, or how such conversion should be accomplished.

Data elements 442 can include data element fields 444, at least some of which can be at least generally similar to domain elements 440. For example, a data element field 444a can correspond to at least a portion of the name domain element 440a, such as being (or including) a unique identifier of a particular data element 442. The field label information described with respect to the name domain element 440a is shown as separated into a short description label 444b, a medium description label 444c, a long description label 444d, and a header description 444e. As described for the name domain element 440a, the labels and header 444b-444e can be maintained in one language or in multiple languages.

A data element field 444f can specify a domain 438 that is used with the data element 442, thus incorporating the features of the domain elements 440 into the data element. Data element field 444g can represent a default value for the data element 442, and can be at least analogous to the default value 422f of the schema 412. A created/modified data element field 444h can be at least generally similar to the domain element 440h.

Tables 446 can include one or more table elements 448. At least a portion of the table elements 448 can be at least similar to domain elements 440, such as table element 448a being at least generally similar to domain element 440a, or data element field 444a. A description table element 448b can be analogous to the description and header labels described in conjunction with the domain element 440a, or the labels and header data element fields 444b-444e. A table 446 can be associated with a type using table element 448c. Example table types include transparent tables, cluster tables, and pooled tables, such as used as in database products available from SAP SE of Walldorf, Germany.

Tables 446 can include one or more field table elements 448d. A field table element 448d can define a particular field of a particular database table. Each field table element 448d can include an identifier 450a of a particular data element 442 used for the field. Identifiers 450b-450d, can specify whether the field is, or is part of, a primary key for the table (identifier 450b), or has a relationship with one or more fields of another database table, such as being a foreign key (identifier 450c) or an association (identifier 450d).

A created/modified table element 448e can be at least generally similar to the domain element 440h.

Example 6—Example Testing of Target Code Using Test Code Having Assertions

Figure 5:
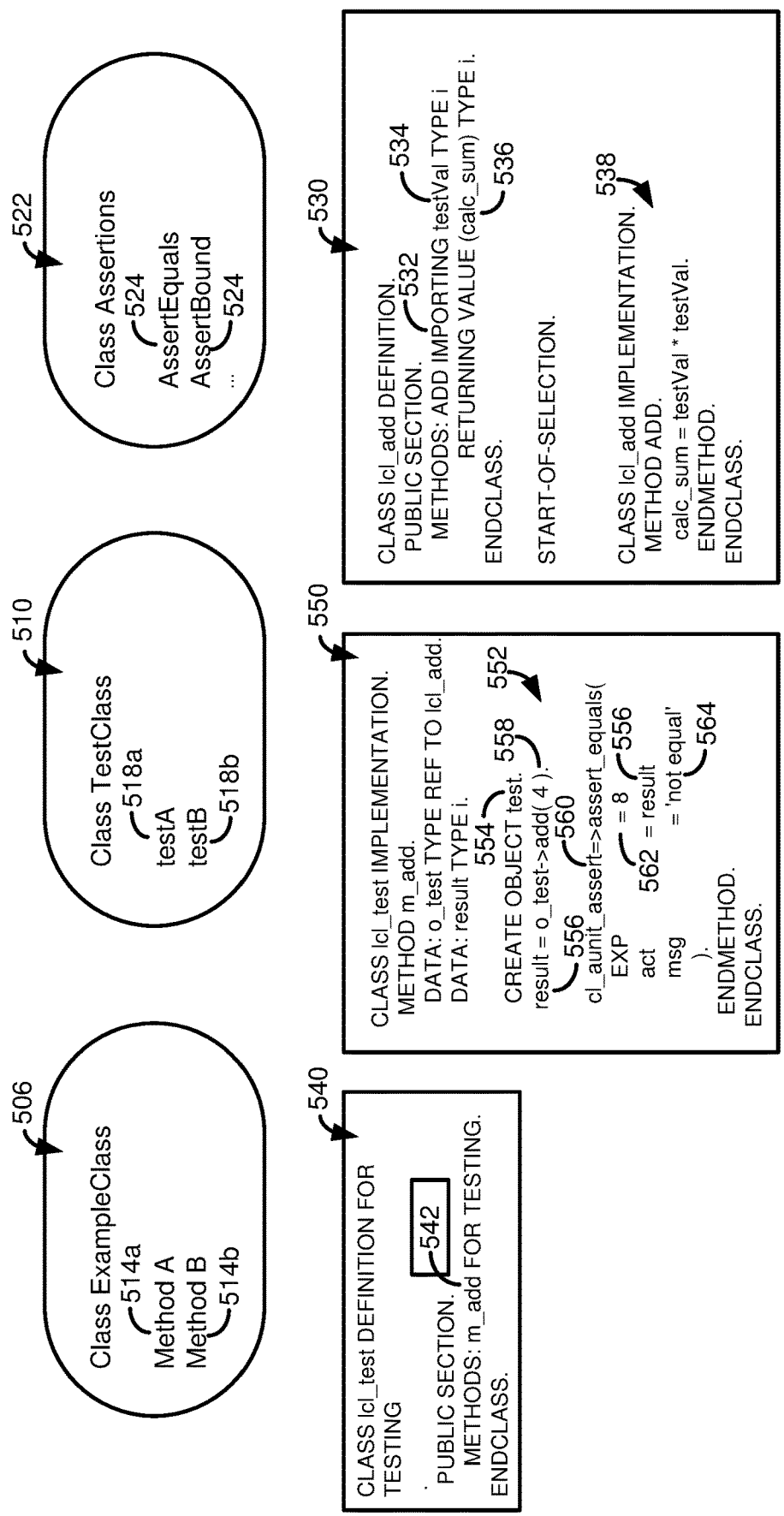
FIG. 5 is a diagram illustrating how a test class can call an assertion method of an assertion class in order to carry out tests for class target code, and example definitions and implementations for a test class and an example implementation of class target code.

FIG. 5 illustrates how test classes can be used to test software components, such as classes, programs, library files, etc. In the example shown, a test class 510 is used for testing of a class 506. The class 506 is shown as having methods 514a, 514b, and the test class 510 has corresponding test methods 518a, 518b. That is, test method 518a tests the operation of method 514a, and test method 518b tests the operation of method 514b.

In some cases, testing can be facilitated by components of a software framework. For example, the ABAP programming language includes a library of test functionality, in the form of assertions that can be made for other software components. An example of this is the assertions class 522, which contains a number of assertion types 524. Assertions can be conditions that are evaluated with respect to other software, and which typically return a Boolean value depending on whether the assertion holds or not with respect to given software being evaluated. Evaluation of assertions can also return exceptions (or other types of error messages or error handling mechanism), rather than Boolean values. Or, a Boolean value (e.g., a value indicating that a desired result was not obtained) can be used to raise an exception (e.g., if return value==FALSE, then raise exception).

Assertions can be called by methods of other classes, such as by test methods 518a, 518b. At least for some types of assertions, a call to a member function of the assertions class 522 can include an actual value obtained by executing a test method 518a, 518b and an expected value. In the case of an "assert equals" assertion, a value of FALSE can be returned if the actual and expected values are not the same (which in turn can indicate that the test has failed).

FIG. 5 also presents code for an example class 530, an example test class definition 540 of a test class that includes methods to test the class 530, and an example test class implementation 550 for the test class definition 540. The class 530 includes an ADD method 532, which includes an input parameter 534 (e.g., an expected argument provided when the method 532 is called), testVal, and an output parameter 536 (e.g., a value returned by the method), VALUE. While the method 532 is called ADD, and is perhaps intended to return the sum of the input parameter 534 with itself, it can be seen that the implementation 538 of the ADD method instead returns the product of the input parameter with itself. This is a kind of error that software testing could identify.

It can be seen that simply calling the method 532 may be insufficient to determine that it is operating as intended. For example, assume that a value of "3" is provided by a test. The method 532 will return a value of "9," which is not the intended result of "6." While an analysis of the testing of the class 530 might indicate 100% code coverage, since all lines of code are the class 530 are executed by the test with the value of "3," the test is not "good," since it fails to determine that the result provided by the test is not the intended result.

The test class definition 540 defines a test method 542, m_add, for testing the method 532. The test class implementation 550 contains an implementation 552 of the test method 542. The implementation 552 declares an object 554 as an instance of the class 530, and a variable 556 to hold a result of a call to the method 532 using the object 554. At line 558, the variable 556 is assigned the value of calling the ADD method 532 with a value of "4." Note that, at this point, the test class of the definition 540 and implementation 550 would be indicated as providing 100% code coverage for the class 530, even though the class 530 might not operate in the intended manner. The test class might indicate that the class 530 did not crash when called, but would provide no information about whether it operated as intended.

However, the test class implementation 550 includes an assertion 560 that calls an "assert_equals" method of a unit test class in the ABAP programming language. The assertion 560 specifies an expected value 562, the variable 556, and a message 564 to be displayed if the expected value does not equal the value of the variable 556 when the assertion is made. In this case, the test class implementation 550 would identify that the value returned by calling the method 532 with a value of "4," is not the expected value of "8," but is rather "16." The test would thus fail, indicating to a developer that the method 532 may need correction.

Note that, even if assertions are present in a test method, the quality of an assertion may not be particularly good in providing an indication as to whether code is functioning as intended. In the above example, providing an assertion value of "2" would match an expected result of "4," since the product and sum of 2 and 2 are both 4. Thus, it may be useful to measure the quality of an assertion by making changes to the target code (e.g., the implementation 538) or values used in testing the code.

Figure 6:
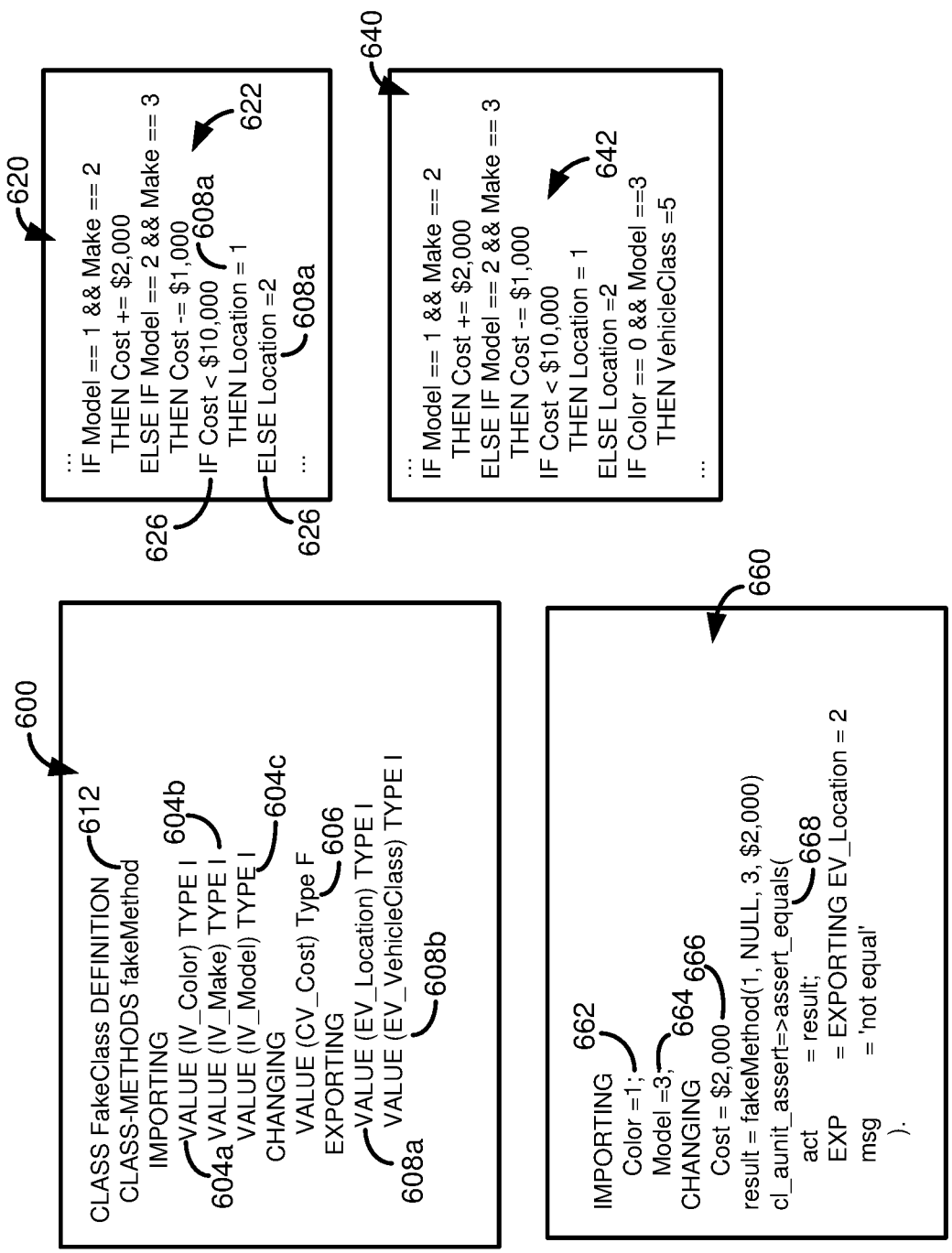
FIG. 6 provides an example class definition and two example implementations for the class, illustrating how input values can affect one or more output values.

Example 7—Class Definition and Implementations Illustrating Relationships Between Output Values and Input Values FIG. 6 provides an example class definition 600 that indicates how a software component, such as a method of a class, can have multiple parameters of multiple types. Parameters can have different types, which types can be used in determining a quality of a test for the software component. Parameters can include input parameters, which are values or references to values (e.g., a reference to a variable) that are provided to a software component, and which the software component may use during execution, including to influence the value of other variables or actions that the software will perform. The value of an input parameter is not changed outside of the scope of the software component. For example, a value of a variable in code that calls the software component may be used by the called software, and may be altered locally within the called software component, but the value of the variable is not changed in the calling code. In some cases, fixed values can be provided as input parameters, or values of a variable can be passed by value. Values of variables can also be passed by reference, but are designated as not changing the value (e.g., "constant") of the variable in the scope of the calling code.

Another type of parameter is an export parameter, which can be a parameter of a software component or a return value provided by the software component. Although an export parameter may assign a value to a variable, such as a variable passed by reference as a parameter, a software component does not use a current value of the export parameter in the scope of the calling code. Some parameters can have values that are both used and modified by a software component, and can be referred to a "changing" parameter or an input/output parameter. Changing parameters can be equivalent to passing a variable by value or reference to a software component without an indication that the variable cannot be modified. As used herein, "input value" refers to a value that is provided to a software component for manipulation, such as an input parameter or a changing parameter. An "output value" refers to a value that is changed by a software component and returned to a caller (or otherwise used in another software component), such as an output parameter or a changing parameter.

In one aspect, software testing, such as using assertions or equivalent functionality, is used to determine whether input or changing parameters have an expected effect on an export or changing parameter. Disclosed technologies can be used to analyze test code to determine whether a sufficient number or type of assertions are present in test code. For example, it can be desirable to have at least one assertion for each changing parameter or export parameter. Certain disclosed technologies determine input or changing parameters that may affect a value of an export or changing parameter. If an input value affects a value of an output value, the input value can be said to influence the respective output value.

The definition 600 includes examples of input parameters 604 (shown as 604a-604c), a changing parameter 606, and export parameters 608 (shown as 608a, 608b). The parameters 604, 606, 608 are used with a method 612. Code 622 that is part of a first implementation 620 of the method 612 may represent a portion of a larger code section of the implementation 620. The code 622 includes the "location" export parameter 608a. The code 622 can be analyzed to determine what affects the final value assigned to the export parameter 608a. It can be seen that conditional operations 626 assign a value to "location" based on a value of the changing parameter 606, "cost." In turn, it can be seen that the value of "cost" is determined using the "make" input parameter 604b and the "model" input parameter 604c. Thus, "cost," "make," and "model" can be said to influence the final value of "location."

Code 622 also modifies a value (e.g., an input value) for the "cost" changing parameter 606. As described, cost 606 is modified by the input parameters 604b, 604c. So, input parameters 604b, 604c can be said to influence the final value of "cost." In the code 622, the input parameter 604a, "color," does not affect a value of "cost" or a value of "location."

Code 642 is associated with a second implementation 640 of the method 612 can be analyzed in a similar manner as the code 622. In the code 642, it can be seen that input parameter 604a and input parameter 604c influence the value of the export parameter 608b, "VehicleClass."

Figure 7:
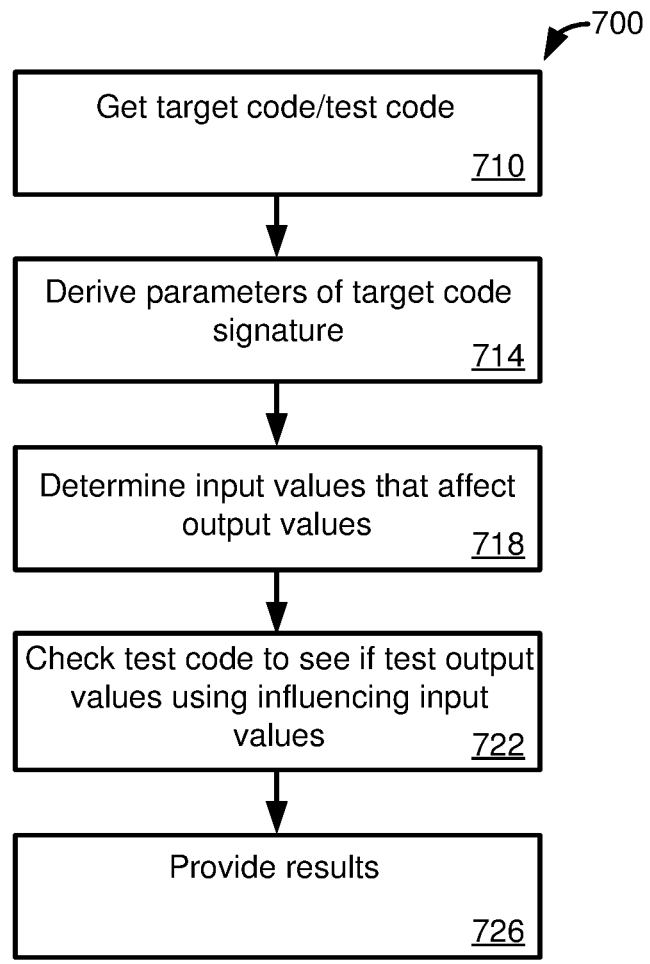
FIG. 7 is a flowchart of an example method of evaluating test code by determining if the test code includes assertions for output values of target code.

Example 8—Example Evaluation of Test Code by Determining Target Code Output Values Associated with Assertions in the Test Code FIG. 7 is a flowchart of a method 700 for a static code analysis technique for determining a quality associated with test code. At 710, code to be tested ("target code") is obtained. In some cases, a software component of the target code can be an object in a repository, where the object represents a class that is to be tested using test code. Test code for the target code can also be obtained at 710. Parameters for a code signature of the object are determined at 714. For example, a definition of a method can be analyzed to determine input parameters, output parameters, changing parameters, or a combination thereof that are included in the target code. At 718, parameter interdependencies are determined, such as determining changing parameters or input parameters that affect a value of a changing parameter or an export parameter.

It is determined at 722 whether tests in the test code evaluate the output values (e.g., for export parameters or changing parameters) using the input values (e.g., input parameters or changing parameters) that influence a given output value. The results of this determination are provided at 726, such as in the form of a report. The report can provide information such an indication of whether a parameter associated with an output value is covered by an assertion, or whether an assertion tests the effect of all input values that might affect the output value. A report can also account for different importance of input values or output values. Individual parameters can be associated with a qualitative score or ranking indicating their importance. An overall measure of test code quality can weight different parameters differently (in which case, the overall score can be a weighted average or other weighted aggregation of values for individual parameters).

Importance can be determined in various manners, and at various stages of the method 700, such as calculating importance when results are determined at 726, calculating importance at 722 when analyzing the code, or calculating the importance at 726 using information determined when analyzing the code at 722. In one example, importance can be indicated by an amount of processing for a particular import or output value. If a particular input value undergoes significant processing in order to produce an output value, that can indicate that it may be important to have testing, or more extensive testing, for the parameters associated with the input or output values. In a similar manner, a larger code base can be analyzed to determine how an output value is used, where output values that are subjected to significant processing or other factors (e.g., being returned to a user or a particular process) can indicate that the associated parameter should have a higher importance.

If the target code has been used under real or simulated workloads, workload execution information can be used, at least in part, in determining the importance of a parameter. Code that tends to be executed more frequently, such as particular branches of a logic conditions (e.g., cases for a switch statement, or THEN/ELSE branches of an IF statement), can be indicated as more important, as can any parameters associated with such code. Users can also manually specify some parameters as having higher importance than others. Importance can be determined using a combination of factors, such as weighting both how often code is called and how much a given parameter is processed.

A measure of test quality can thus include an indicator of how well a parameter is tested given its importance. Less testing, or possibly even no testing, may be acceptable for parameters that undergo little processing, or which are associated with code (e.g., logic branches) that are infrequently executed. Test quality can also be based at least in part on evaluating values used for testing, in addition to whether a parameter is tested at all, a degree of testing, and an importance associated with the parameter. Evaluating values used in test code can include determining how representative test values are to actual values that may be used for testing (which can be obtained, in some cases, from database tables from which input values might be obtained, from analyzing historical or simulated use of particular software, or from analyzing how a particular value is used in other code, including when the value is associated with a particular data type, such as a particular type of attribute or data element, where analyzing software use or how values are used in other code can be carried out using machine learning techniques), and looking at a number of values tested compared with a range of input values that might be used. Taking again the example of a database table, assume that a particular attribute of a particular table provides possible input values for target code. If the attribute has a large cardinality (number of unique possible values/the domain of the attribute), it may be expected that a larger number of values should be tested by test code. If the attribute values are associated with a meaningful order (e.g., integer values that represent an analog world quantity as opposed to strings that represent more arbitrary subject matter, such as names), test quality may also account for whether values at endpoints or median values are tested.

Results provided at 726 can include suggestions for improving test quality. In addition to identifying parameters that are not associated with tests at all, results provided at 726 can include suggestions to increase a number of tests for important parameters identified as insufficiently tested, or perhaps to even reduce a number of tests for parameters identified as relatively unimportant.

As an example of how the method 700 can operate, consider again the code 622 of FIG. 6, in conjunction with a test method 660. The test method 660 evaluates the changing parameter 606 of "cost," and provides values 662, 664, 666 for the input parameters 604a, 604c, and for the changing parameter 606. The test method 660 includes an assertion 668, which tests the export parameter 608a. If this was the only test of the method 632, evaluation of the test method 700 maybe indicate two errors. First, the results provided at 726 may indicate that no assertion has been defined for the output parameter 608b. Second, the results provided at 726 may indicate that, although an assertion has been defined for the output parameter 608a, the assertion fails to provide values for input parameter 604b, which was determined to influence the value of the output parameter 608b.

Example 9—Example Method of Dynamically Evaluating Test Code by Altering Test Data or Target Code As discussed in Examples 1 and 6-8, even if code includes assertions, even for all relevant parameters of the code (e.g., output values, such as for export or changing parameters), the assertions may not be of sufficient quality for purposes of testing the code. Recall the example of the ADD method that was implemented as a product—the result with an input value of "2" is the coincidentally the expected result of "4," even though the code was incorrect.

One measure of test code quality can be how specific/sensitive the test is to the code being tested. That is, if the test code is tailored to the code to be tested, it might be expected that changes to the code being tested or to the values used in the testing should cause the test code to report a failure. In the example of the ADD method, one way of evaluating the test code would be to alter the input value from "2" to "3." This alteration would cause the test code to fail, since the value of "9" would not match the expected value of "4." Note that, in this case, even though changing the input values causes the test to fail, it may not alert a developer to the actual issues with the code. In a similar manner, the code of the ADD method could be altered, such as to not return a value, to return a specific value, or to perform a different operation or additional operations than specified in the original code.

Figure 8:
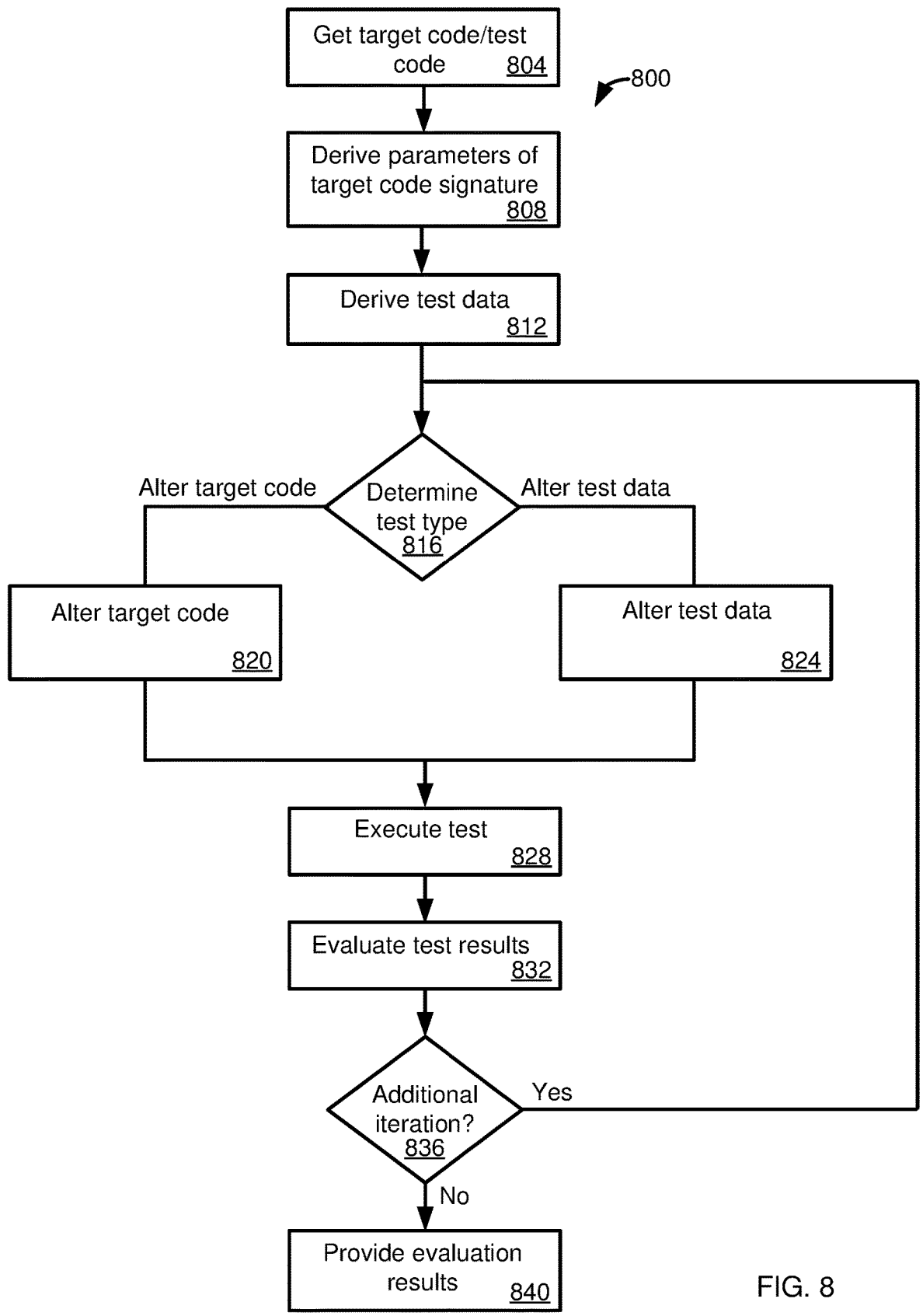
FIG. 8 is a flowchart of an example method of dynamically evaluating test code by changing test data or target code.

FIG. 8 is a flowchart of a method 800 for dynamically evaluating test code, where the dynamic evaluation can involve one or both of changing test data/parameters or altering the code under test. At 804 code to be evaluated, such as test code and the target code it tests, is obtained. Obtaining code at 804 can be analogous to obtaining code at 710 in the method 700. At 808, parameters for a code signature of the target code are determined, which can be carried out analogously to determining parameters at 714. Values used in the test code are determined at 812.

At 816, the method 800 determines whether an iteration of test code evaluation will proceed by altering the target code or by altering test parameters values or other test data. That is, it may harder to isolate the cause of a failure if both the target code and test data are altered in the same iteration. Similarly, in at least some cases, only a single data value or single code alteration is made for each iteration at 816.

If it was determined at 816 that the target code should be altered, an alternation can be made to the target code at 820. A code alteration can include adding one or more lines of code to the target code, removing one or more lines of code from the target code, or altering one or more lines of code (e.g., adding, removing, or changing one or more tokens, syntax elements, or collections thereof). Removing or altering lines of code can include rendering code inoperable, such as by "commenting out" the code.

Typical code changes include altering or removing conditional statements. For example, an operator associated with a conditional statement, such as an equality operator, an inequality operation, a greater than or less than operator, etc., can be changed to a different operator. Or, a value used with an operator can be changed to different value. The code with the operator can also be commented out so that it does not execute.

In a similar manner, an entire conditional statement, or elements of a conditional statement, can be removed or modified. Conditional statements such as IF, THEN, ELSE statements can be removed entirely, or portions of a statement (e.g., a THEN, or ELSE branch) can be removed (such as by commenting them out), or actions taken in response to a logic branch (THEN, ELSE) can be altered compared with original actions taken in the target code. Switch statements (or other multiway branch statements) can be modified in a similar manner.

A rule set can include information about changes that can be made to target code, including associating priorities or severity levels with different types of code changes. For example, a rule could be "comment out <random> line," where the line being commented out changes between test iterations. Or, if commenting out single code lines does not cause test failure (i.e., target code still satisfies test criteria in test code), additional lines of code can be commented out (e.g., first one line is commented out, then two lines, then three, etc.). In addition to increasing a number of code lines commented out, test severity can be increased by commenting out multiple contiguous lines of code. Commenting out a larger block of code, in some cases, may be more likely to cause test failure than commenting out an equivalent number of lines of code that are not located in a block.

If it was determined at 816 that test iteration will be carried out using changed test data, the test data can be altered at 824. Altering the test data can include altering input values (e.g., from input parameters or changing parameters) or other data used by the target code. For example, assume that the target code performs operations on a database, such as by selecting and processing certain data in one or more specified database tables. Changing the test data at 824 can include changing contents of the table referenced by the target code, changing the table referenced by the target code (e.g., replacing a specified table name with a different table name), or changing the database operations (e.g., changing the content of a SQL statement). Like changes to target code, changes to test code data can be associated with priorities or severity levels, and increasingly severe test data changes, or use of lower priority test conditions, can be selected during execution of the method 800 (such as if evaluation of test code continues to provide passing results). In an example, a value of an input value can be progressively increased or decreased between test iterations, or values otherwise further from an originally-specified value can be used.

As with changes to target code, it may be desirable to limit a number of changes to test data for a given evaluation (including to a single change), so that the effect of a change on a test result can be more easily determined. However, in other cases, it may be desirable to try and cause test code to fail (e.g., the target code does not pass a test specified in the test code), without regard to what cause the failure. In this case, both for changes to test data at 824 and changes to target code at 820, multiple changes (e.g., multiple portions of the target code are changed, or multiple test data elements) are made in the same iteration. In a similar manner, the method 800 has been described as deciding at 816 whether a test iteration will change target code at 820 or test data at 824, to help isolate the cause of test failure, and to allow for systematic evaluation of test code. However, in other embodiments, the method 800 can change both target code and test data in a single evaluation iteration.

The test code can be executed on the target code at 828, using the target code as modified at 820 or the test data as modified at 824. Prior to the evaluation, if the evaluation iteration involves modifying target code at 820, and the modified target code is in a compiled language, relevant code portions can be recompiled (e.g., the altered code, along with any code incorporated by the altered code, and any other compiled code that in turn incorporates the altered target code).

At 832, the results of the test code execution are evaluated. The results can be an indication of whether the test succeeded or failed. The results can be added to a log, where the log can record a particular change that was made for a test execution (e.g., what target code was altered or what test data was altered). At 836, it can be determined if additional testing iterations (e.g., making additional target code changes or test data changes) should be carried out. If so, the method 800 can return to 816. If additional iterations are not to be carried out, the method 800 can proceed to 840, where results of the test evaluation can be provided, such as to a user (e.g., a developer or development supervisor).

Determining whether additional testing iterations are to be carried out can be based on one or more criteria. For example, a number of iterations can be specified, and a counter incremented each time a test is executed at 828. If the specified number of iterations has not been reached, it can be determined at 836 that the method 800 should proceed to 816, proceeding to 840 otherwise. In another example, a running time can be specified, and the method 800 can proceed to 816 if it is determined at 836 that the specified running time has not been reached. Other criteria can include a number of failures, where testing is performed until a threshold number of failures occur. Combinations of criteria may also be used at 836, such as specifying that testing will continue until the first of a threshold running time or a threshold number of iterations have been carried out. Or a combination could be specified as thresholds for both first and second criteria being met.

In some cases, changes made to target code or test data can be made progressive more drastic. Thus, it can be useful to track a number of testing iterations needed to accomplish a set number of failures, where smaller numbers of tests to achieve the threshold can indicate better quality test code (since fewer/more minor changes were required to achieve failed tests). Similarly, changes can be associated with a degree or other measure of complexity or severity, and a degree (or average or other aggregated value) of complexity required to cause test failure, or a determined number of failures, can be used to provide feedback regarding test code quality. When changes made during an iteration of test code evaluation are associated with a severity, a user (or computer process) may set a minimum or maximum level of change severity for the process. For example, a user may define the process 800 as starting with a severity level of 0 (which can represent minor changes to target code or test data) and ending with a severity level of 5 (which can represent moderate changes to target code or test data).

If it is determined at 836 that additional evaluations should be performed, 836 or 816 can include determining a type of evaluation or nature (e.g., implementation details) of an evaluation to be performed in a next evaluation iteration. Rules can be defined that determine when 816 switches between altering target code at 820 or altering test data at 824. Such switching can occur at a single point during an execution of the method 800, or can occur multiple times during an execution of the method. Switching can be set to occur using static or dynamic criteria. Static criteria can include carrying out a defined number of iterations using one type of alteration (target code or test data) and then switching to the other type of alteration (where the switch can occur once or multiple times during execution of the method, such switching every n iterations, where n is an integer greater than or equal to 1) until it is determined at 836 that no more iterations are to be performed. Dynamic criteria can include carrying out a first type of alteration until a failure is encountered and then switching to a second type of alteration. Or, dynamic criteria can include carrying out evaluations using a first type of alteration until a qualitative measure associated with the alteration (e.g., a complexity or degree of change) satisfies a threshold, and then changing to a second type of alteration.

Determining how a change should be made during an evaluation iteration can be performed at one or more of 836, 816, 820, or 824. In some cases, a set of changes can be defined (for example, prior to execution of the method 800), and 816 can include sequentially (or otherwise in a specified manner) applying changes of the set of changes. A set of changes can be stored, such as in a file, and a user or process may select one or more sets of changes to be used in an execution of the method 800. In other cases, at least a portion of changes made during an execution of the method 800 can be determined dynamically. Dynamically determining how changes can be made can also be based on defined rules (e.g., conditional logic) or heuristics. Rules can include altering test conditions based on the importance of a parameter or particular code, where important parameters or code are tested more extensively than comparatively unimportant parameters or code.

User configuration information can also influence how testing occurs, such as user input identifying particular parameters or code to receive more extensive testing than others. A user (or process) can also specify configuration settings such as a number of values to be tested, particular values to be tested, or whether values are selected randomly or based on other criteria. In some cases, values used during testing can be selected from data historically used during execution of the software, or by considering a domain of possible values for a parameter (e.g., by considering the domain of an attribute of a table that is associated with a particular input value). Or, data used for testing can come from a definition of a parameter, such as when the parameter is associated with a data element or domain, as described in Examples 2-5.

As will be described in Example 10, one or more elements of the method 800 can be carried out in conjunction with a machine learning model, such as determining when additional evaluations should be carried out at 836, determining a type of evaluation at 816, or determining changes to be made to target code at 820 or to test data at 824. The machine learning model can take into account the importance of various parameters or types of code, such as by using this information when training a machine learning algorithm to produce the machine learning model.

Testing results provided at 840 can summarize results of individual evaluation iterations, as well as overall evaluation results. Overall evaluation results can include a number of iterations where the target code satisfied the test code or a number of iterations where the target code failed the test code (e.g., did not satisfy conditions specified in the test code as indicating that the target code "passed" or satisfied the test). Evaluation results can also include details regarding the types of changes that did or did not result in test failure, which can include both a general test type (e.g., changing target code or changing test data) or various categories of change implementations (e.g., changing conditional logic in the target code versus commenting out code portions, or changing input values versus changing other data accessed by the target code).

Test results can also summarize results by test severity, such as indicating a number of failures for low severity tests, moderate severity tests, or high severity tests. Test results provided at 840 can include information related to the importance of a parameter, and to a sufficiency of testing, as described for the method 700 of FIG. 7. A machine learning model can be used to provide an indication of test code quality, including using a model that accounts for different weights associated with different parameters or code (e.g., such that "important" parameters are more likely to affect whether a given test is labelled "good" or "bad").

In some cases, the test results provided at 840 can include suggestions on how test code may be improved, including as described for providing test results at 726. For example, if tests routinely provide "pass" results even when test data is changed, the test results can recommend that additional assertions be created for one or more output values or can recommend input values to be used in the assertions (for example, those that caused the test to fail during evaluation). If changes to target code did not result in test failure, the results provided at 840 can indicates portions of the target code (e.g., those that affect a value of an output value) that should be considered for targeting with additional test code, since the existing test code may not be sensitive to changes in those portions of the target code.

Test results provided at 840 can also summarize differences between different executions of the method 800, including for different versions of the test code or the target code. By showing differences in test results between different versions of the test code, a developer may be able to determine whether test code has improved. Typically, a higher failure rate (or shorter time to reach specified failure criteria) can indicate that test code is better tuned to the target code.

Example 10—Example Computing Environment for Evaluating Test Code

Figure 9:
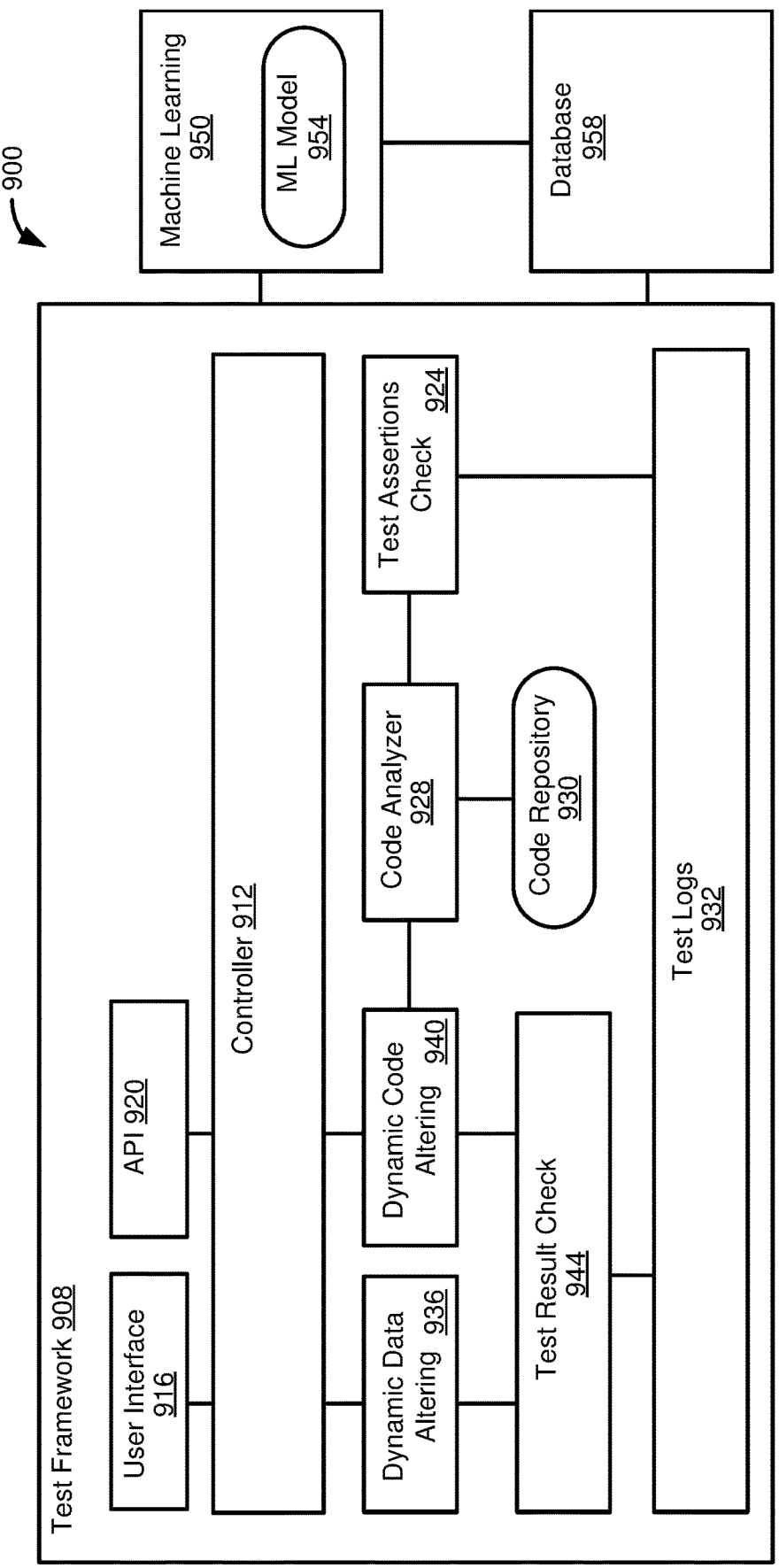
FIG. 9 is a block diagram of an example computing environment in which disclosed technologies can be implemented.

FIG. 9 illustrates a computing environment 900 in which disclosed technologies can be implemented. The computing environment 900 includes a test framework 908. The test framework can perform functions for creating tests, executing tests, analyzing test results, and providing test results. In a particular example, the test framework 908 can be the ABAP Test Cockpit of SAP SE, of Walldorf, Germany. More generally, the test framework 908 can be part of, or accessible by, a software development tool, such as an integrated development environment (IDE).

The test framework 908 includes a controller 912. The controller 912 can be responsible for carrying out, including coordinating, various test code evaluation processes. For example, the controller 912 can be responsible for overall execution of the method 700 of FIG. 7 or the method 800 of FIG. 8, including calling additional components of the computing environment 900 as needed.

The controller 912 can communicate with a number of components, including a user interface 916 and an application program interface 920. The user interface 916 can allow a user to perform various actions, such as defining or modifying test code, defining or modifying definitions of evaluations to be performed on test code, executing evaluations, and receiving information regarding test results. The application program interface 920 can facilitate the performance of similar processes as the user interface 916, but with respect to various applications (which can be part of the test framework 908 or external to the test framework), including in response to user input received using user interfaces associated with such applications.

The controller 912 can be configured to perform various types of evaluations, including the static evaluation described in Example 8 and the dynamic evaluation described in Example 9. In carrying out a static evaluation, the controller 912 can call a test assertions check component 924. The test assertions check components can perform operations in the method 700 of FIG. 7. The test assertions check component 924 can call a code analyzer 928. The code analyzer 928 can retrieve target code and test code for the target code from a code repository 930. Or, the controller 912 can obtain code from the repository 930 and provide the code to the code analyzer 928.

The code analyzer 928 can then carry out operations to determine parameters and other data used by the target code and test data (e.g., input values for assertions) used in the test code. The code analyzer 928 can also determine weights, such as based on importance, for parameters or code by looking at how parameters are processed or using rules, historical data, or a machine learning model to evaluate the importance of particular code segments.

The test assertions check component 924 can receive analysis results from the code analyzer 928, and determine whether the test data, and particular tests (e.g., assertions) in the test code correlate with parameters and other data used by the target code (such as whether the test code includes assertions for output values of the target code, or includes a sufficient number or variety of such assertions). The result of this analysis can include an indication of output values that are not tested by the test code. The results of the test code analysis performed by the test assertions check component 924 can be stored by a test logging component 932, as well as being sent to the controller 912, which in turn can provide the test results to the user interface 916 or the application program interface 920.

In carrying out a dynamic evaluation, the controller 912 can call a dynamic data altering component 936 and a dynamic code altering component 940. The dynamic data altering component 936 can perform operations to alter test data, as described in the method 800 of FIG. 8. Similarly, the dynamic code altering component 940 can perform operations to alter target code, as described in the method 800. The dynamic code altering component 940 can call the code analyzer 928, such as to determine how target code should be modified or to carry out target code modifications as instructed by another component (e.g., the controller 912). The dynamic data altering component 936 or the dynamic code altering component 940 can retrieve code from the repository 930, or the controller 912 can retrieve code from the repository and provide the code to the dynamic data altering component or the dynamic code altering component.

The controller 912 can perform operations of the method 800, such as determining whether the dynamic data altering component 936 or the dynamic code altering component 940 should be called for a given evaluation iteration, determining parameters to be used in altering test data or test code (which can then be sent to the appropriate component 936, 940), or determining whether additional test evaluation iterations should be performed.

The dynamic data altering component 936 and the dynamic code altering component 940 can provide results to a test result check component 944. The test result check component 944 can determine whether execution of the test code indicated success or failure, which indication can be stored by the test logging component 932. In some cases, the test result check component 944 can perform other functions, such as instructing the controller 912 whether additional evaluation iterations should be performed, a type of evaluation that should be performed, or providing implementation details or instructions regarding an evaluation that should be performed. The controller 912 can receive one or more results provided by the test result check component 944 and return them to the user interface 916 or to the application user interface 920.

The test framework 908 can communicate with a machine learning component 950. Although shown as separate from the framework 908, in other implementations the machine learning component 950 can be included in the framework 908. In one aspect, the machine learning component 950 can be used to determine a type of test evaluation to be performed or implementation details for a test evaluation. For example, the machine learning component 950 can include a model 954 trained using data from the test logging component 932, the code repository 930, or a database 958. The database 958 can store information about prior test evaluations, including information correlating changes made during an evaluation to a test result, and optionally information about code features in target code associated with a given evaluation.

The machine learning model 954 can use prior evaluations to determine what types of target code changes or test data changes cause tests to fail. Providing test code, and optionally target code, to the machine learning model 954 can cause the machine learning model to suggest a target code change or test data to be used in an evaluation. Results of applying these suggestions can be provided as input to further train the machine learning model 954.

In one aspect, a machine learning algorithm (such as a neural network) can be trained with examples of "good" test code and its accompanying target code, "bad" test code and its accompanying target code, or a combination thereof. A classifier can than evaluate test code and target code submitted for evaluation. The classifier can provide a score indicating whether the submitted test code appears to be "good" or "bad." In addition, the classifier can suggest ways to modify the test code to improve the test code or to evaluate it using techniques such as the method 800 of FIG. 8. For example, the machine learning model can suggest a target code modification or a test data modification that is present in "good" test code or its associated target code. Whether test and target code being analyzed has a passing or failing test result after a modification can be provided as additional training data for the machine learning mode.

Techniques such as association rule mining can also be used to identify relationships between test code, target code, or test data that be used in a ruleset for a test code evaluation method, such as the method 800 of FIG. 8.

Example 11—Example Test Code Evaluation Techniques

FIG. 10 is a flowchart of a method 1000 for analyzing assertions in test code compared with target code tested by the test code. The method 1000 can be carried out in the computing environment 900 of FIG. 9, and can represent a particular implementation of the method 700 of FIG. 7. At 1010, a request to analyze test code is received. The test code and target code tested by the test code are retrieved at 1020. At 1030, one or more first parameters associated with input values for the target code are determined. One or more second parameters associated with output values for the target code are determined at 1040. At 1050, it is determined if the test code includes assertions for the second parameters. Analysis results are provided at 1060, indicating that at least one second parameter is not associated with an assertion.

FIG. 11 is a flowchart of a method 1100 for dynamically analyzing test code by changing values used to test target code. The method 1100 can be carried out in the computing environment 900 of FIG. 9, and can represent a particular implementation of, or particular actions carried out during, the method 800 of FIG. 8. At 1104, a request to analyze test code is received. The test code and target code tested by the test code are retrieved at 1108. At 1112, one or more first parameters for the target code are determined, where the first parameters are associated with input values for the target code. A first value specified in the test code for a third parameter selected from the one or more first parameters is determined at 1116. At 1120, one or more second parameters are determined for the test code, where the second parameters are associated with output values for the target code. A fourth parameter, selected from the one more second parameters, having a value that depends on a value of the third parameter is determined at 1124. At 1128, an assertion specified in the test code for the fourth parameter is determined. The test code is executed at 1132 using a second value instead of the first value. At 1136, it is determined whether the assertion is valid using the second value. An output is provided at 1140, where the output is based at least in part on the determining if the assertion is valid.

FIG. 12 is a flowchart of a method 1200 for dynamically analyzing test code by making changes to target code tested by test code. The method 1200 can be carried out in the computing environment 900 of FIG. 9, and can represent a particular implementation of, or particular actions carried out during, the method 800 of FIG. 8. A request to analyze test code is received at 1204. At 1208 test code and target code tested by the test code are retrieved. One or more first parameters associated with output values of the target code are determined at 1212. At 1216, a portion of the target code is determined that affects a value of a second parameter selected from the one or more first parameters. The portion of target code is altered at 1220 to produce altered target code. An assertion specified in the test code for the second parameter is determined at 1224. At 1228, the test code is executed on the altered target code. It is determined at 1232 whether the assertion is valid based on execution of test code on the altered target code. Results are returned at 1236, the results based at least in part on the determining if the assertion is valid.

Example 12—Computing Systems

Figure 13:
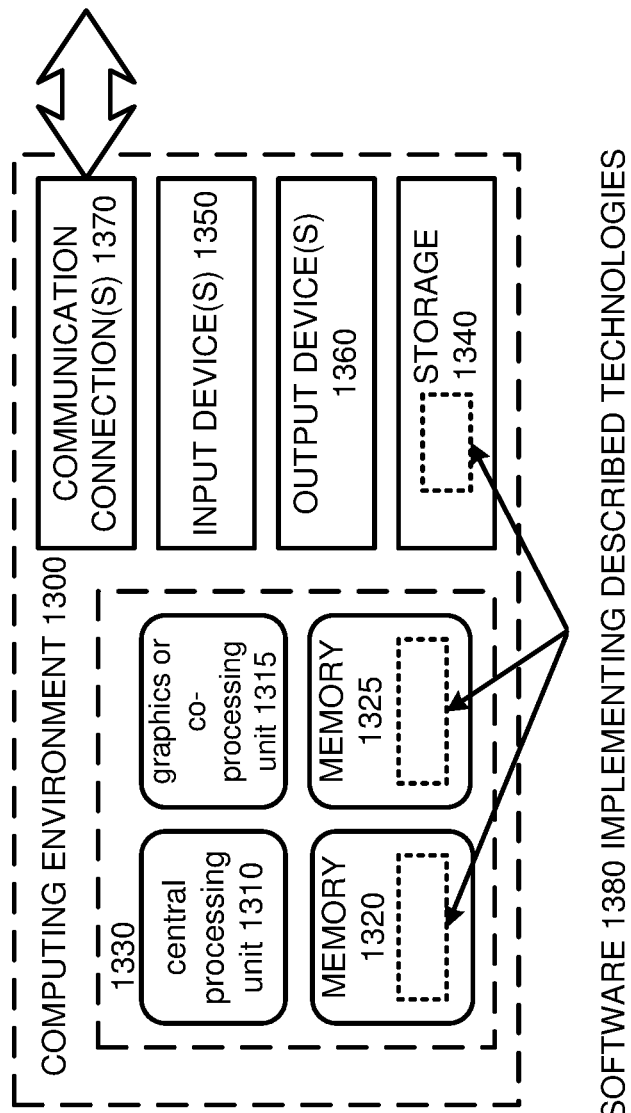
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the architecture 900 of FIG. 9, including as further described in Examples 1-11. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way, and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 14:
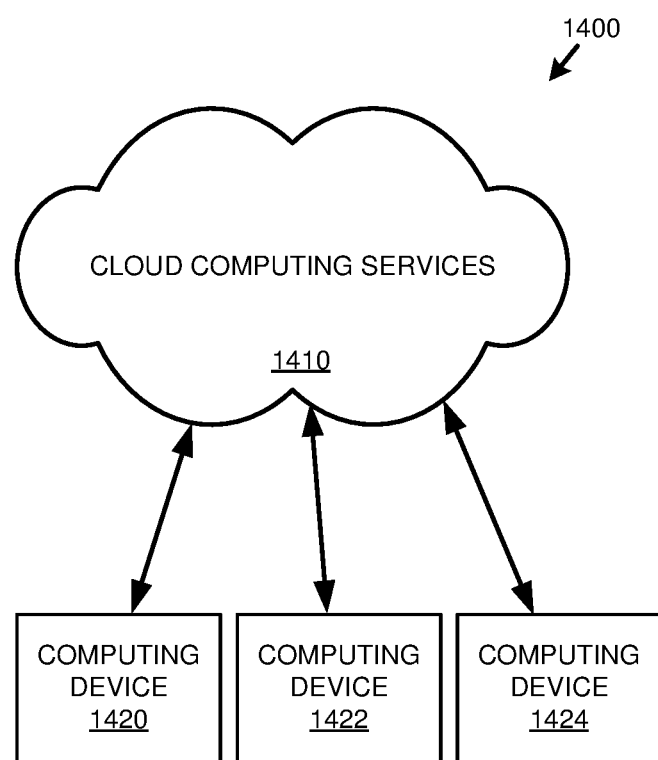
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising at least one hardware processor and at least one memory coupled to the at least one hardware processor, the method comprising:
    receiving a request to analyze test code;
    retrieving the test code and target code tested by the test code;
    determining one or more input parameters in the target code;
    determining one or more output parameters in the target code, wherein a given output parameter of the one or more output parameter also serves as an input parameter or serves only as an output parameter;
    determining if the test code comprises assertions for the one or more output parameters, wherein an assertion specifies a predicate for an output parameter and execution of the test code returns a Boolean value for the predicate associated with a given assertion;
    determining an amount of operations in the target code that process a first input parameter selected from the one or more input parameters;
    determining a number of assertions in the test code for a first output parameter selected from the one or more output parameters and having a value determined at least in part using a value of the first input parameter;
    comparing the number of assertions with a threshold; and
    providing analysis results, wherein the analysis results are based at least in part on the amount of operations in the target code that process the first input parameter and whether the threshold is satisfied.

2. The method of claim 1, further comprising:
    assigning an importance value to the first output parameter or a second output parameter of the one or more output parameters based at least in part on the amount of operations in the target code that process the first input parameter.

3. The method of claim 2, wherein the analysis results comprise a score, the score being determined at least in part using a weighting calculated at least in part using the importance value.

4. The method of claim 1, further comprising:
    determining a score based at least in part on a number of output parameters of the one or more output parameters not associated with an assertion.

5. A computing system comprising:
    at least one memory;
    one or more hardware processing units coupled to the at least one memory; and
    one or more computer readable storage media storing instructions that, when executed, cause the computing system to perform operations comprising:
        receiving a request to analyze test code;
        retrieving the test code and target code tested by the test code;
        determining one or more input parameters in the target code;
        determining one or more output parameters in the target code, wherein a given output parameter of the one or more output parameter also serves as an input parameter or serves only as an output parameter;
        determining if the test code comprises assertions for the one or more output parameters, wherein an assertion specifies a predicate for an output parameter and execution of the test code returns a Boolean value for the predicate associated with a given assertion;

determining an amount of operations in the target code that process a first input parameter selected from the one or more input parameters;

determining a number of assertions in the test code for a first output parameter selected from the one or more output parameters and having a value determined at least in part using a value of the first input parameter;

comparing the number of assertions with a threshold; and providing analysis results, wherein the analysis results are based at least in part on the amount of operations in the target code that process the first input parameter and whether the threshold is satisfied.

6. The computing system of claim 5, the operations further comprising:

assigning an importance value to the first output parameter or a second output parameter of the one or more output parameters based at least in part on the amount of operations in the target code that process the first input parameter.

7. The computing system of claim 6, wherein the analysis results comprise a score, the score being determined at least in part using a weighting calculated at least in part using the importance value.

8. The computing system of claim 5, wherein the operations comprise:

determining a score based at least in part on a number of output parameters of the one or more output parameters not associated with an assertion.

9. The computing system of claim 5, the operations further comprising:

determining a first value specified in the test code for the first input parameter or a second input parameter selected from the one or more input parameters;

determining an assertion specified in the test code for the first output parameter;

executing the test code using a second value instead of the first value; and determining if the assertion is valid based on execution of the test code using the second value.

10. The computing system of claim 9, wherein the third parameter is associated with a data element of a data model, the data element being associated with a domain, the domain consisting of valid values for the data element, and wherein the second value is selected from the domain.

11. The computing system of claim 9, further comprising:

(1) determining one or more values for the first input parameter used in one or more executions of a plurality of executions of the test code; and selecting the second value from the one or more values; or (2) randomly selecting the second value.

12. The computing system of claim 11, further comprising:

training a machine learning algorithm with the one or more values to generate a machine learning model;

wherein selecting the second value from the one or more values is carried out using the machine learning model.

13. The computing system of claim 9, further comprising, after determining if the assertion is valid:

determining that additional test code evaluation should be performed;

determining that the target code should be modified;

determining a portion of the target code that affects a value of the second output parameter; and altering the portion of the target code.

14. The computing system of claim 13, wherein the altering comprises commenting out at least one operation defined in the portion of the target code.

15. The computing system of claim 13, wherein altering the portion of the target code is based at least in part on output of a machine learning model.

16. The computing system of claim 9, wherein the test code is executed on the target code a plurality of times, and additional executions are performed until termination criteria are satisfied.

17. One or more non-transitory computer-readable storage media comprising:

computer-executable instructions that, when executed by a computing system comprising at least one hardware processor and at least one memory coupled to the at least one hardware processor, cause the computing system to receive a request to analyze test code;

computer-executable instructions that, when executed by the computing system, cause the computing system to retrieve the test code and target code tested by the test code;

computer-executable instructions that, when executed by the computing system, cause the computing system to determine one or more input parameters in the target code;

computer-executable instructions that, when executed by the computing system, cause the computing system to determine one or more output parameters in the target code, wherein a given output parameter of the one or more output parameter also serves as an input parameter or serves only as an output parameter;

computer-executable instructions that, when executed by the computing system, cause the computing system to determine if the test code comprises assertions for the one or more output parameters, wherein an assertion specifies a predicate for an output parameter and execution of the test code returns a Boolean value for the predicate associated with a given assertion;

computer-executable instructions that, when executed by the computing system, cause the computing system to determine an amount of operations in the target code that process a first input parameter selected from the one or more input parameters;

computer-executable instructions that, when executed by the computing system, cause the computing system to determine a number of assertions in the test code for a first output parameter selected from the one or more output parameters and having a value determined at least in part using a value of the first input parameter;

computer-executable instructions that, when executed by the computing system, cause the computing system to compare the number of assertions with a threshold; and computer-executable instructions that, when executed by the computing system, cause the computing system to provide analysis results, wherein the analysis results are based at least in part on the amount of operations in the target code that process the first input parameter and whether the threshold is satisfied.

18. The one or more non-transitory computer-readable storage media of claim 17, further comprising:

computer-executable instructions that, when executed by the computing system, cause the computing system to assign an importance value to the first output parameter or a second output parameter of the one or more output parameters based at least in part on the amount of operations in the target code that process the first input parameter.

19. The one or more non-transitory computer-readable storage media of claim 18, wherein the analysis results comprise a score, the score being determined at least in part using a weighting calculated at least in part using the importance value.

20. The one or more non-transitory computer-readable storage media of claim 17, further comprising:
   computer-executable instructions that, when executed by the computing system, cause the computing system to determine a score based at least in part on a number of output parameters of the one or more output parameters not associated with an assertion.

* * * * *